(12) United States Patent
Kuroda et al.

(10) Patent No.: US 11,170,262 B2
(45) Date of Patent: Nov. 9, 2021

(54) TRAINING SYSTEM, TRAINING DEVICE, METHOD FOR TRAINING, TRAINING DATA CREATION DEVICE, TRAINING DATA CREATION METHOD, TERMINAL DEVICE, AND THRESHOLD VALUE CHANGING DEVICE

(71) Applicant: MORPHO, INC., Tokyo (JP)

(72) Inventors: Yasuhiro Kuroda, Tokyo (JP); Masaki Hiraga, Tokyo (JP); Kenji Okuma, Tokyo (JP); Michihiro Kobayashi, Tokyo (JP); Hiroshi Koyama, Tokyo (JP)

(73) Assignee: MORPHO, INC., Tokyo (JP)

( * ) Notice: Subject to any disclaimer, the term of this patent is extended or adjusted under 35 U.S.C. 154(b) by 601 days.

(21) Appl. No.: 15/771,735

(22) PCT Filed: Oct. 14, 2016

(86) PCT No.: PCT/JP2016/080558
§ 371 (c)(1),
(2) Date: Apr. 27, 2018

(87) PCT Pub. No.: WO2017/073373
PCT Pub. Date: May 4, 2017

(65) Prior Publication Data
US 2018/0307946 A1     Oct. 25, 2018

(30) Foreign Application Priority Data

Oct. 30, 2015  (JP) .............................. JP2015-215057
Jul. 19, 2016  (JP) .............................. JP2016-141558

(51) Int. Cl.
*G06K 9/62*     (2006.01)
*G06N 3/08*     (2006.01)
(Continued)

(52) U.S. Cl.
CPC .......... *G06K 9/6257* (2013.01); *G06F 16/48* (2019.01); *G06K 9/6259* (2013.01);
(Continued)

(58) Field of Classification Search
CPC .... G06F 16/48; G06K 9/6257; G06K 9/6259; G06K 9/6262; G06N 3/04; G06N 3/08; G06N 3/084; G06N 20/00
See application file for complete search history.

(56) References Cited

U.S. PATENT DOCUMENTS 9,552,549 B1 *  1/2017  Gong ................... G06N 3/0454
2007/0177791 A1  8/2007  Shi et al.
(Continued)

FOREIGN PATENT DOCUMENTS

CN  102298606 A  12/2011
CN  103049792 A  4/2013
(Continued)

OTHER PUBLICATIONS

Etienne Côme et al., "Mixture model evaluation with soft labels", HAL, archives-ouvertes.fr, Fourth International Workshop on Soft Methods in Probabilities and Statistics, Sep. 2008, total 9 pages.
(Continued)

*Primary Examiner* — Peet Dhillon
(74) *Attorney, Agent, or Firm* — Sughrue Mion, PLLC

(57) ABSTRACT

A training system comprises a training device, and a training data creation device. The training device trains a neural network. The training data creation device acquires any one of a positive evaluation indicating that content of the input data coincides with the label, a negative evaluation indicating that content of the input data does not coincide with the label, and an ignorable evaluation indicating exclusion from a training target label, for each label regarding the input data to create training data. In training the neural network for
(Continued)

training, the training system adjusts the weight coefficient for the intermediate layer and makes the recognition score of the label with the ignorable evaluation not affect the adjustment of the weight coefficient for the intermediate layer.

14 Claims, 27 Drawing Sheets

(51) Int. Cl.
  *G06F 16/48* (2019.01)
  *G06N 3/04* (2006.01)
(52) U.S. Cl.
  CPC .............. *G06K 9/6262* (2013.01); *G06N 3/04* (2013.01); *G06N 3/084* (2013.01)

(56) References Cited

U.S. PATENT DOCUMENTS

| | | | |
|---|---|---|---|
| 2011/0004573 A1 | 1/2011 | Chitiveli et al. | |
| 2011/0066650 A1 | 3/2011 | Fuxman et al. | |
| 2012/0269436 A1 | 10/2012 | Mensink et al. | |
| 2014/0247978 A1* | 9/2014 | Devin | G06K 9/6262 382/159 |
| 2014/0355871 A1* | 12/2014 | Mohamed | G06K 9/6262 382/159 |
| 2015/0248608 A1* | 9/2015 | Higgins | G06N 3/08 706/16 |
| 2016/0110642 A1* | 4/2016 | Matsuda | G06N 3/04 706/25 |
| 2016/0125274 A1 | 5/2016 | Zhou et al. | |
| 2016/0189010 A1* | 6/2016 | Tang | G06K 9/627 382/113 |

FOREIGN PATENT DOCUMENTS

| | | |
|---|---|---|
| CN | 103207870 A | 7/2013 |
| CN | 105009171 A | 10/2015 |
| JP | 2001-109733 A | 4/2001 |
| JP | 2002-008000 A | 1/2002 |
| JP | 2005-215988 A | 8/2005 |
| JP | 2008-165824 A | 7/2008 |
| JP | 2014-229124 A | 12/2014 |
| JP | 2014-238763 A | 12/2014 |
| JP | 2015-170281 A | 9/2015 |
| JP | 6271085 B2 | 1/2018 |
| WO | 2016/070098 A2 | 5/2016 |

OTHER PUBLICATIONS

Rong Jin et al., "Learning with Multiple Labels", In Advances in Neural Information Processing, 2002, total 8 pages.
Christian Leistner et al., "Improving Classifiers with Unlabeled Weakly-Related Videos", IEEE Computer Society International Conference on Computer Vision and Pattern Recognition, 2011, total 8 pages.
International Search Report dated Dec. 20, 2016, in counterpart International Application No. PCT/JP2016/080558.
Communication dated Sep. 25, 2018 issued by the Japanese Patent Office in counterpart application No. 2017-188820.
Michael Egmont-Petersen, "Image Recognition with Neural Networks HowTo", Oct. 3, 2015, XP055585494, Retrieved from the Internet: URL <https://web.archive.org/web/20151003130333/http://neuroph.sourceforge.net/image_recognition.html>, [retrieved on May 3, 2019], pp. 1-6 (total 6 pages).
Communication dated May 15, 2019 from European Patent Office in counterpart EP Application No. 16859603.9.
International Preliminary Report on Patentability with translation of Written Opinion in International Application No. PCT/JP2016/080558, dated May 11, 2018.
Li Yuan-hang et al., "Active Learning for Multi-label Classification of Graphs", Computer Science, vol. 41, No. 11, Nov. 2014, pp. 260-264.
Brodley et al., "Identifying Mislabeled Training Data", Journal of Artificial Intelligence Research, vol. 11, 1999, pp. 131-167.

\* cited by examiner (B) 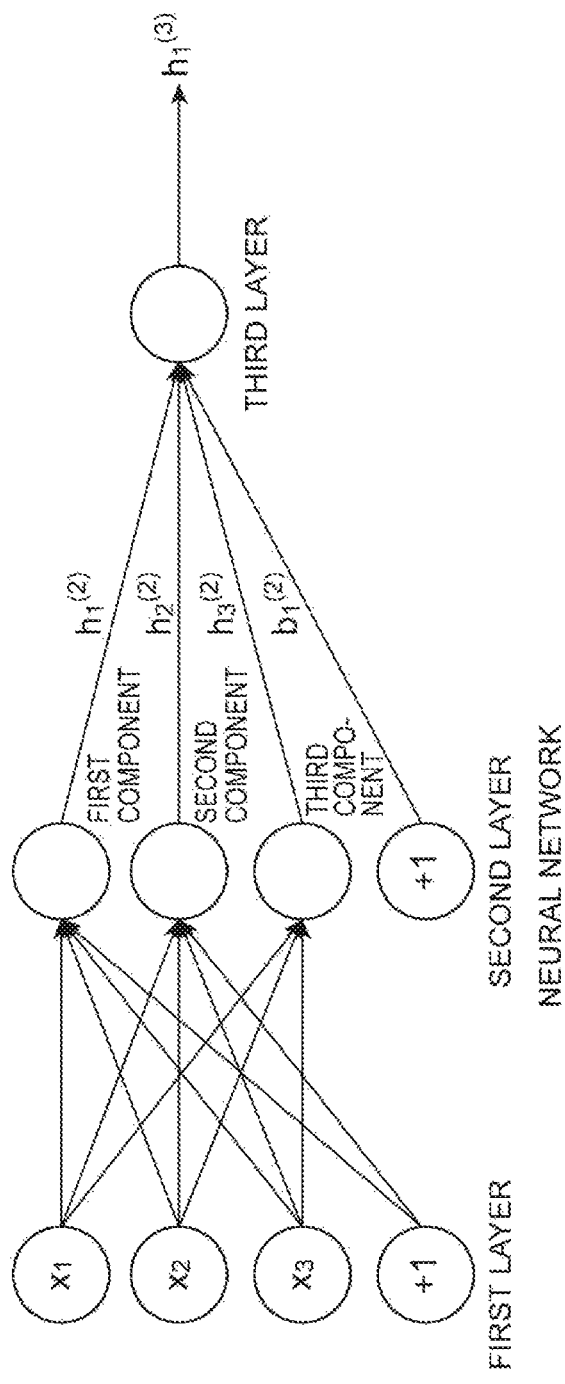

|  | FIRST LABEL L1 | SECOND LABEL L2 | THIRD LABEL L3 |
|---|---|---|---|
| INPUT DATA T1 | POSITIVE | NEGATIVE | IGNORABLE |
| INPUT DATA T2 | POSITIVE | POSITIVE | POSITIVE |
| INPUT DATA T3 | NEGATIVE | IGNORABLE | IGNORABLE |
| INPUT DATA T4 | POSITIVE | IGNORABLE | POSITIVE |
| INPUT DATA T5 | NEGATIVE | NEGATIVE | NEGATIVE |
| ... | ... | ... | ... |
| ... | ... | ... | ... |
| ... | ... | ... | ... |
| INPUT DATA TN | IGNORABLE | POSITIVE | POSITIVE |

(B)

|  | FIRST LABEL L1 | SECOND LABEL L2 | THIRD LABEL L3 |
|---|---|---|---|
| INPUT DATA T1 | 1 | 0 | * |
| INPUT DATA T2 | 1 | 1 | 1 |
| INPUT DATA T3 | 0 | * | * |
| INPUT DATA T4 | 1 | * | 1 |
| INPUT DATA T5 | 0 | 0 | 0 |
| ... | ... | ... | ... |
| ... | ... | ... | ... |
| ... | ... | ... | ... |
| INPUT DATA TN | * | 1 | 1 |

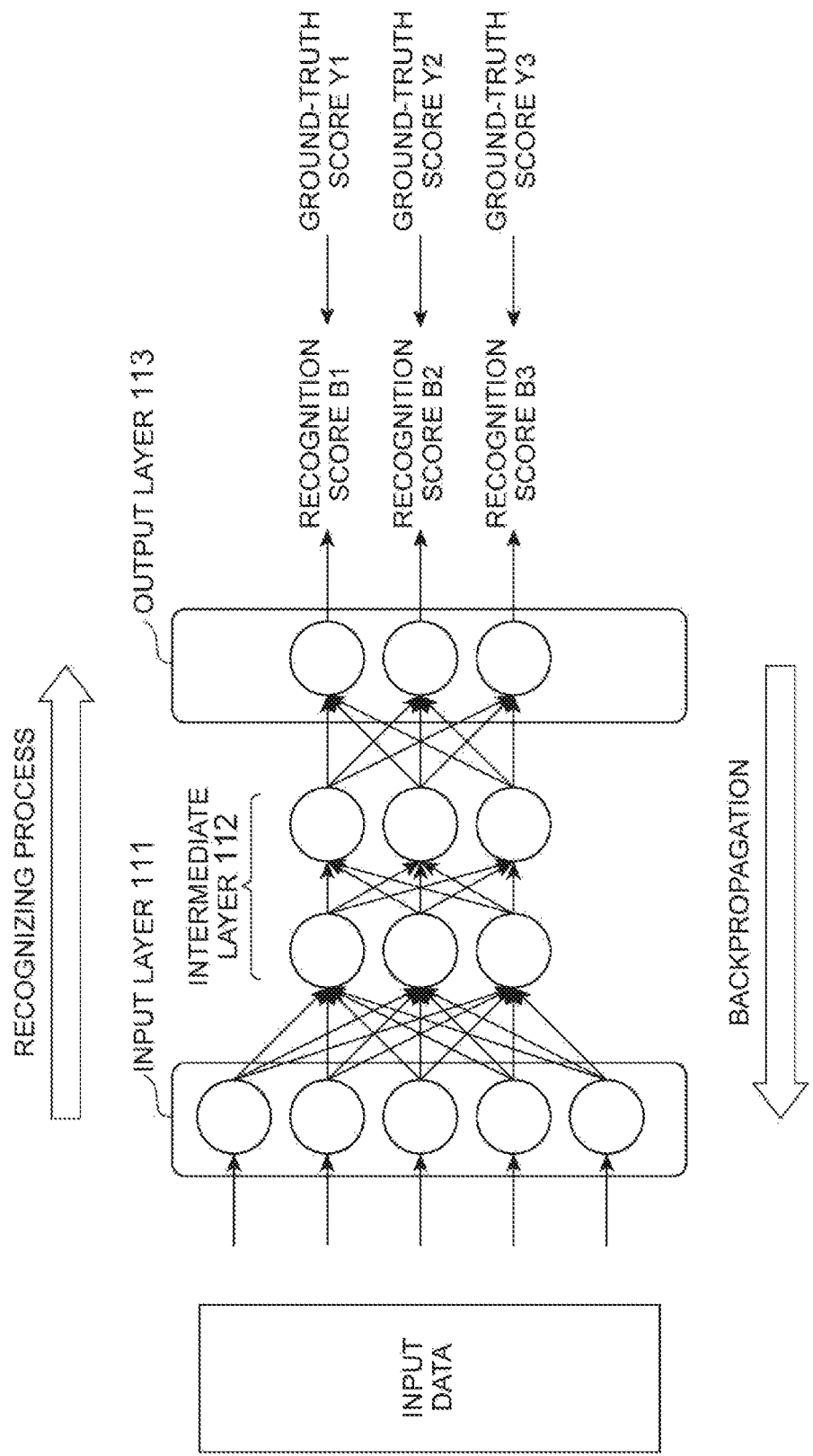

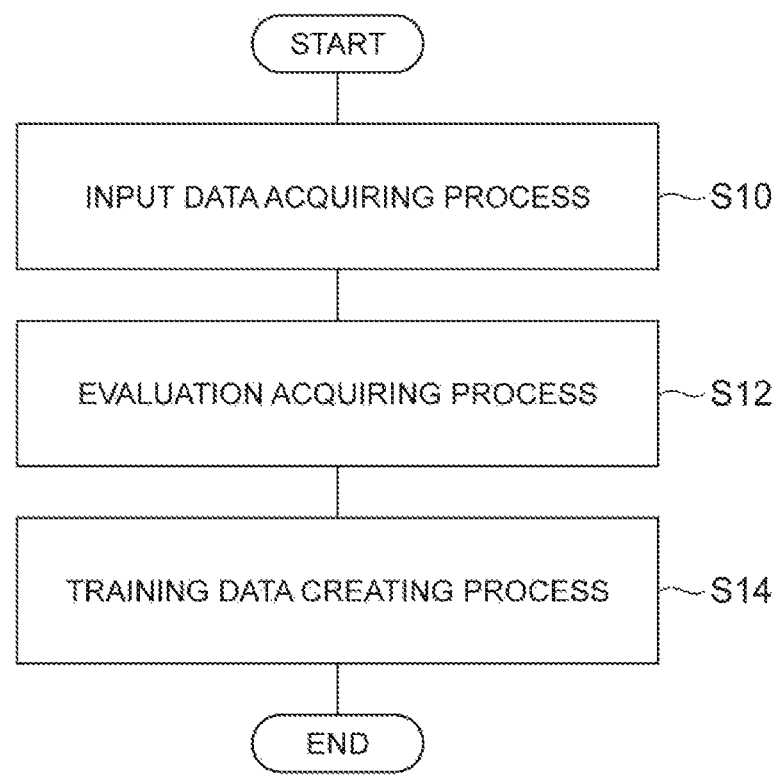

| IDENTIFI-CATION TARGET DATA ID | ACCOMPANYING INFORMATION | PUBLIC LABEL | PRIVATE LABEL | PRIVATE LABEL GIVING DATE AND TIME |
|---|---|---|---|---|
| 1 | RELIABILITY OF PUBLIC LABEL, IMAGING POSITION, IMAGING DATE AND TIME, CAMERA INFORMATION | FLOWER, OUTDOOR | FLOWER VIEWING | XX MONTH/XX DAY, XX O'CLOCK/ XX MINUTES/ XX SECONDS |
| 2 | RELIABILITY OF PUBLIC LABEL, IMAGING POSITION, IMAGING DATE AND TIME, CAMERA INFORMATION, FACIAL RECOGNITION RESULT | PEOPLE | MR.OO | XX MONTH/XX DAY, XX O'CLOCK/ XX MINUTES/ XX SECONDS |
| 3 | RELIABILITY OF PUBLIC LABEL, IMAGING POSITION, IMAGING DATE AND TIME, CAMERA INFORMATION, FACIAL RECOGNITION RESULT | PEOPLE, SCHOOL, INDOOR | — | — |
| 4 | RELIABILITY OF PUBLIC LABEL, IMAGING POSITION, IMAGING DATE AND TIME, CAMERA INFORMATION, FACIAL RECOGNITION RESULT | INDOOR, SAUCER, PEOPLE | — | — |
| ... | ... | ... | ... | ... |
| ... | ... | ... | ... | ... |
| ... | ... | ... | ... | ... |

(B)

| IDENTIFI-CATION TARGET DATA ID | ACCOMPANYING INFORMATION | PUBLIC LABEL | PRIVATE LABEL | PRIVATE LABEL GIVING DATE AND TIME |
|---|---|---|---|---|
| 1 | RELIABILITY OF PUBLIC LABEL, IMAGING POSITION, IMAGING DATE AND TIME, CAMERA INFORMATION | FLOWER, OUTDOOR | FLOWER VIEWING | XX MONTH/XX DAY, XX O'CLOCK/ XX MINUTES/ XX SECONDS |
| 2 | RELIABILITY OF PUBLIC LABEL, IMAGING POSITION, IMAGING DATE AND TIME, CAMERA INFORMATION, FACIAL RECOGNITION RESULT | PEOPLE | MR. OO | XX MONTH/XX DAY, XX O'CLOCK/ XX MINUTES/ XX SECONDS |
| 3 | RELIABILITY OF PUBLIC LABEL, IMAGING POSITION, IMAGING DATE AND TIME, CAMERA INFORMATION, FACIAL RECOGNITION RESULT | PEOPLE, SCHOOL, INDOOR | — | — |
| 4 | RELIABILITY OF PUBLIC LABEL, IMAGING POSITION, IMAGING DATE AND TIME, CAMERA INFORMATION, FACIAL RECOGNITION RESULT | INDOOR, SAUCER, PEOPLE | CHINESE FOOD, FRIEND | XX MONTH/XX DAY, XX O'CLOCK/ XX MINUTES/ XX SECONDS |
| ... | ... | ... | ... | ... |
| ... | ... | ... | ... | ... |
| ... | ... | ... | ... | ... |

Fig.14

| GIVING DATE AND TIME | PRIVATE LABEL | DIFFERENCE | WEIGHT (= 1/DIFFERENCE) |
|---|---|---|---|
| 19:30 | A | 92 | 1/92 |
| 19:30 | A | 92 | 1/92 |
| 19:42 | A | 80 | 1/80 |
| 19:53 | A | 69 | 1/69 |
| 20:04 | A | 58 | 1/58 |
| 20:51 | B | 11 | 1/11 |
| 20:55 | B | 7 | 1/7 |

*Fig.22*
(A) 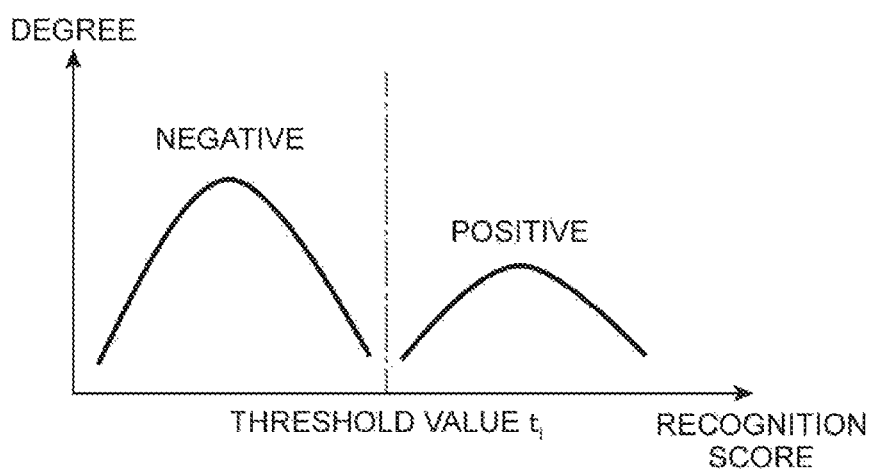
(B) 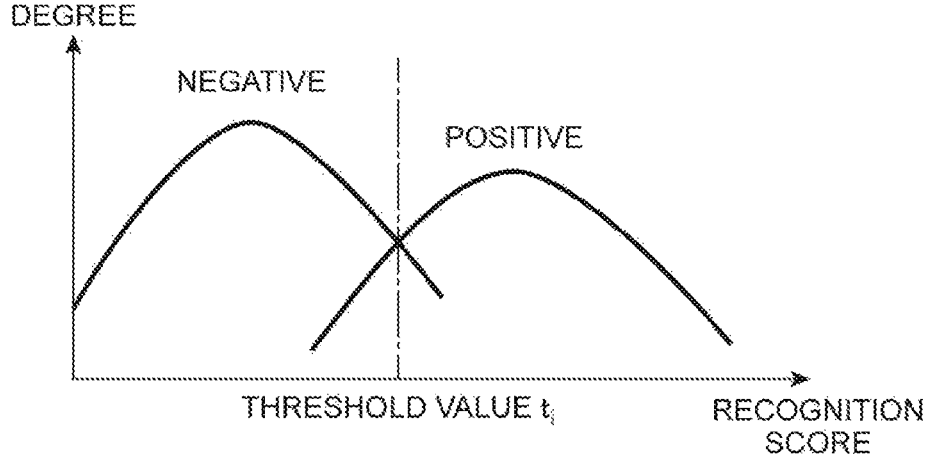
(C) 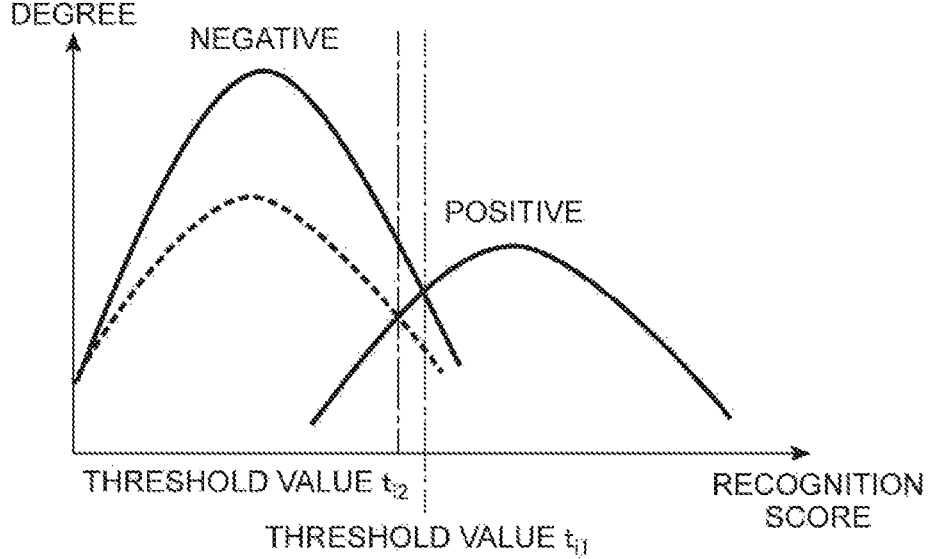

TRAINING SYSTEM, TRAINING DEVICE, METHOD FOR TRAINING, TRAINING DATA CREATION DEVICE, TRAINING DATA CREATION METHOD, TERMINAL DEVICE, AND THRESHOLD VALUE CHANGING DEVICE

CROSS REFERENCE TO RELATED APPLICATIONS

This application is a National Stage of International Application No. PCT/JP2016/080558, filed on Oct. 14, 2016, which claims priority from Japanese Patent Application No. 2015-215057, filed on Oct. 30, 2015 and Japanese Patent Application No. 2016-141558, filed on Jul. 19, 2016.

TECHNICAL FIELD

The present disclosure relates to a training system, a training device, a method for training, a training program, a training data creation device, a method for creating training data, a training data creation program, a terminal device, and a threshold value changing device.

BACKGROUND ART

Patent Document 1 describes a device which trains a neural network by means of a backpropagation algorithm, the neural network using a plurality of labels to classify recognition target data. The neural network includes an input layer, a plurality of intermediate layers (hidden layers), and an output layer. The input layer includes a plurality of artificial neurons. Each of the intermediate layers includes a plurality of artificial neurons. The output layer includes artificial neurons the number of which is the same as the number of labels. The training device uses training data including input data and evaluations of the labels to train the neural network.

The evaluation of the label includes a "positive evaluation" indicating that data content coincides with the label, and a "negative evaluation" indicating that data content does not coincide with the label. The positive evaluation or the negative evaluation is associated with a numerical value such as "0" or "1" (ground-truth score), and such a numerical value is also referred to as ground truth. The training device acquires the input data in the input layer, and performs an arithmetic operation in the intermediate layer to adjust an arithmetic operation parameter of the intermediate layer such that a recognition score output from the output layer comes closer to the ground-truth score of the evaluation.

Here, the way to give the label (classification way) by the neural network includes single label classification in which only one label selected from among a plurality of labels is given to the recognition target data, and multi-label classification in which a plurality of labels selected from among a plurality of labels are permitted to be given to the recognition target data. In a case of the single label, when a label has the positive evaluation, other labels have the negative evaluations. On the other hand, in a case of the multi-label, a plurality of labels may have the positive evaluations.

In the training data of the multi-label, the evaluation of a part of the labels may be incorrect or not exist. Non Patent Documents 1 to 3 describe that, as an approach to the incomplete training data like this, the evaluation of the label is automatically estimated by another training.

CITATION LIST

Patent Document

Patent Document 1: Japanese Unexamined Patent Publication No. 2014-229124

Non Patent Document

Non Patent Document 1: E. Come, L. Oukhellou, T. Denoeux, and P. Aknin. Mixture model evaluation with soft labels. International Conference on Soft Methods in Probability and Statistics, 2008
Non Patent Document 2: R. Jin and Z., Ghahramani. Learning with multiple labels. In Advances in Neural Information Processing 2002
Non Patent Document 3: C. Leistner, M Godec, S. Schulter, A. Saffari, M. Werlberger and H. Bischof. Improving Classifiers with Unlabeled Weakly-Related Videos. IEEE Computer Society International Conference on Computer Vision and Pattern Recognition. 2011

SUMMARY OF INVENTION

Technical Problem

In the approach of related art that the evaluation of the label is automatically estimated by another training, a workload on a person giving the label (annotator) may be probably reduced, but a correct evaluation cannot be necessarily estimated. For this reason, in this technical field, it is desired to prevent training based on incorrect evaluation from being performed.

Solution to Problem

A training system according to an aspect of the present invention comprises a training device, and a training data creation device for the training device. The training device trains a neural network by means of a backpropagation algorithm, the neural network using a plurality of labels to classify recognition target data. The training data creation device creates training data for the training device. The training data creation device includes an input data acquisition unit, an evaluation acquisition unit, and a training data creation unit. The input data acquisition unit acquires input data. The evaluation acquisition unit acquires any one of a positive evaluation indicating that content of the input data coincides with the label, a negative evaluation indicating that content of the input data does not coincide with the label, and an ignorable evaluation indicating exclusion from a training target label, for each label regarding the input data acquired by the input data acquisition unit. The training data creation unit associates the input data acquired by the input data acquisition unit with the evaluation for each label acquired by the evaluation acquisition unit to create the training data. The training device includes a training data acquisition unit, an input layer, an intermediate layer, an output layer, and a backpropagation unit. The training data acquisition unit acquires the training data created by the training data creation device. The input layer acquires, as a score, the input data included in the training data acquired by the training data acquisition unit. The intermediate layer performs an arithmetic operation on the score acquired by the input layer by use of a weight coefficient. The output layer outputs a recognition score for each label by use of the score subjected to the arithmetic operation by the intermediate layer. The backpropagation unit adjusts the weight coefficient for the intermediate layer by use of the recognition score for each label output by the output layer and a ground-truth score of the evaluation for each label. The backpropagation unit adjusts the weight coefficient for the intermediate layer such that the recognition score of the label with the positive evaluation or the negative evaluation comes closer to the ground-truth score of the positive evaluation or the negative evaluation, and makes the recognition score of the label with the ignorable evaluation not affect the adjustment of the weight coefficient for the intermediate layer.

In the training system, any one of the positive evaluation, the negative evaluation, and the ignorable evaluation is acquired as the evaluation of the label for each label by the training data creation device to create the training data. In other words, the training system can train by use of the training data capable of including a new evaluation, "ignorable evaluation", besides the "positive evaluation" and the "negative evaluation". The training device adjusts the weight coefficient for the intermediate layer such that the recognition score of the label with the positive evaluation or the negative evaluation comes closer to the ground-truth score of the positive evaluation or the negative evaluation, and makes the recognition score of the label with the ignorable evaluation not affect the adjustment of the weight coefficient for the intermediate layer. Therefore, it is possible to improve accuracy performance of the recognition unit for the label with the positive evaluation or the negative evaluation, and to not affect the accuracy performance of the recognition unit for the label with the ignorable evaluation. In a framework of related art that the positive evaluation or negative evaluation should be necessarily given to the input data, an approach has been used in which an incomplete evaluation of the label is made closer to the complete evaluation of the label by estimation or the like. In contrast to this, by introducing a new evaluation, ignorable evaluation, a new approach can be used in which only the correctly given evaluation among the incomplete evaluations is used to train, it is possible to prevent training based on the incorrect evaluation from being performed.

In an embodiment, the backpropagation unit may set the ground-truth score of the ignorable evaluation to the same value as the recognition score of the label with the ignorable evaluation, change a difference between the ground-truth score of the ignorable evaluation and the recognition score of the label with the ignorable evaluation to 0, or change a derivative of the difference between the ground-truth score of the ignorable evaluation and the recognition score of the label with the ignorable evaluation to 0. By doing so, back-propagation is performed also on the label with the ignorable evaluation, but the weight coefficient for the intermediate layer is not adjusted. Therefore, the back-propagation for the label with the ignorable evaluation can be invalidated without changing a configuration of the neural network or a mathematical expression of the back-propagation by the backpropagation unit.

In an embodiment, the backpropagation unit may block connection of the neural network for the label with the ignorable evaluation. This makes it possible to directly invalidate the back-propagation itself.

In an embodiment, the training data creation unit may associate a label, an evaluation of the label being unable to be acquired by the evaluation acquisition unit, with the ignorable evaluation. This enables training without forcedly setting a label not evaluated to the positive evaluation or the negative evaluation.

In an embodiment, the training data creation device may include a reception unit configured to accept a user operation specifying the evaluation of the label, and the evaluation acquisition unit may acquire the evaluation of the label specified by the user operation accepted by the reception unit. In this way, by using the configuration in which a user can change or add the evaluation, it is possible to not only prevent training based on the incorrect evaluation from being performed but also perform training based on a correct evaluation, and as a result, the accuracy performance of the recognition unit can be improved.

In an embodiment, the reception unit may accept the user operation specifying an evaluation of a part of the labels of the input data, and the training data creation unit may associate the evaluation of the part of the labels acquired by the evaluation acquisition unit with the input data acquired by the input data acquisition unit, and make evaluations of remaining labels of the input data have the ignorable evaluations. The configuration like this allows the training data to be created even if a part of the labels is evaluated.

In an embodiment, the training data creation unit may make the evaluations of all labels of the input data have the ignorable evaluations, before associating the evaluation of the label acquired by the evaluation acquisition unit with the input data acquired by the input data acquisition unit. In this way, all labels may be set to the ignorable evaluation as a default setting, and those of which evaluations can be acquired can be changed from the ignorable evaluation to the positive evaluation or the negative evaluation. Specifically, in a case the annotator works, a need to explicitly specify the ignorable evaluation can be eliminated.

A training device according to another aspect of the invention is a training device training a neural network by means of a backpropagation algorithm, the neural network using a plurality of labels to classify recognition target data. The training device comprises a training data acquisition unit, an input layer, an intermediate layer, an output layer, and a backpropagation unit. The training data acquisition unit acquires training data, the training data including input data and an evaluation for each label associated with the input data in advance. The input data is associated with any one of a positive evaluation indicating that content of the input data coincides with the label, a negative evaluation indicating that content of the input data does not coincide with the label, and an ignorable evaluation indicating exclusion from a training target label, for each label. The input layer acquires, as a score, the input data included in the training data acquired by the training data acquisition unit. The intermediate layer performs an arithmetic operation on the score acquired by the input layer by use of a weight coefficient. The output layer outputs a recognition score for each label by use of the score subjected to the arithmetic operation by the intermediate layer. The backpropagation unit adjusts the weight coefficient for the intermediate layer by use of the recognition score for each label output by the output layer and a ground-truth score of the evaluation for each label. The backpropagation unit adjusts the weight coefficient for the intermediate layer such that the recognition score of the label with the positive evaluation or the negative evaluation comes closer to the ground-truth score of the positive evaluation or the negative evaluation, and makes the recognition score of the label with the ignorable evaluation not affect the adjustment of the weight coefficient for the intermediate layer.

The training device can train by use of the training data capable of including a new evaluation, "ignorable evaluation", besides the "positive evaluation" and the "negative evaluation". The training system adjusts the weight coefficient for the intermediate layer such that the recognition score of the label with the positive evaluation or the negative evaluation comes closer to the ground-truth score of the positive evaluation or the negative evaluation, and makes the recognition score of the label with the ignorable evaluation not affect the adjustment of the weight coefficient for the intermediate layer. Therefore, it is possible to improve accuracy performance of the recognition unit for the label with the positive evaluation or the negative evaluation, and to not affect the accuracy performance of the recognition unit for the label with the ignorable evaluation. In a framework of related art that the positive evaluation or negative evaluation should be necessarily given to the input data, an approach has been used in which the evaluation of an incomplete label is made closer to the evaluation of the complete label by estimation or the like. In contrast to this, by introducing a new evaluation, ignorable evaluation, a new approach can be used in which only the correctly given evaluation among the incomplete evaluations is used to train, it is possible to prevent training based on the incorrect evaluation from being performed.

A training data creation device according to another aspect of the invention is a training data creation device creating training data for a training device, the training device training a neural network by means of a backpropagation algorithm, the neural network using a plurality of labels to classify recognition target data. This device comprises an input data acquisition unit, an evaluation acquisition unit, and a training data creation unit. The input data acquisition unit acquires input data. The evaluation acquisition unit acquires any one of a positive evaluation indicating that content of the input data coincides with the label, a negative evaluation indicating that content of the input data does not coincide with the label, and an ignorable evaluation indicating exclusion from a training target label, for each label regarding the input data acquired by the input data acquisition unit. The training data creation unit associates the input data acquired by the input data acquisition unit with the evaluation for each label acquired by the evaluation acquisition unit to create the training data.

As described above, since a supervised training needs the ground truths of all labels, the training data creation involves a cost. Particularly, in the case of the multi-label, unlike the case of the single label, there is no relationship that when a label has the positive evaluation, other labels have the negative evaluations, and therefore, all labels need to be given either the positive evaluation or the negative evaluation. Further, the training data creation may be performed by a person (annotator) in some cases. The annotator needs to make the evaluation of the label in order to create the training data whether or not he/she is confident of the evaluation of the label. For this reason, training based on the incorrect evaluation may be probably performed. In contrast to this, in the training data creation device, any of the positive evaluation, the negative evaluation, and the ignorable evaluation is acquired as the evaluation of the label for each label to create the training data. Specifically, the training data creation device can make the training data include a new evaluation, "ignorable evaluation", besides the "positive evaluation" and the "negative evaluation". By introducing a new evaluation, ignorable evaluation, a new approach can be used in which only the correctly given evaluation among the incomplete evaluations is used to train, it is possible to prevent training based on the incorrect evaluation from being performed.

A method according to another aspect of the invention is a method for training a neural network by means of a backpropagation algorithm, the neural network using a plurality of labels to classify recognition target data. The method comprises a training data acquiring step, an input data acquiring step, an arithmetic operating step, an outputting step, and a backpropagation step. The training data acquiring step acquires training data, the training data including input data and an evaluation for each label associated with the input data in advance. The inputting step acquires by an input layer, as a score, the input data included in the training data acquired in the training data acquiring step. The arithmetic operating step performs, by an intermediate layer, an arithmetic operation on the score acquired in the inputting step by use of a weight coefficient. The outputting step outputs, by an output layer, a recognition score for each label by use of the score subjected to the arithmetic operation in the arithmetic operating step. The backpropagation step adjusts the weight coefficient for the intermediate layer by use of the recognition score for each label output in the outputting step and a ground-truth score of the evaluation for each label. The input data is associated with any one of a positive evaluation indicating that content of the input data coincides with the label, a negative evaluation indicating that content of the input data does not coincide with the label, and an ignorable evaluation indicating exclusion from a training target label, for each label. The backpropagation step adjusts the weight coefficient for the intermediate layer such that the recognition score of the label with the positive evaluation or the negative evaluation comes closer to the ground-truth score of the positive evaluation or the negative evaluation, and makes the recognition score of the label with the ignorable evaluation not affect the adjustment of the weight coefficient for the intermediate layer.

An effect of the method for training is the same as the effect of the training device described above.

A method according to another aspect of the invention is a method for creating training data for a training device, the training device training a neural network by means of a backpropagation algorithm, the neural network using a plurality of labels to classify recognition target data. This method comprises an input data acquiring step, an evaluation acquiring step, and a training data creating step. The input data acquiring step acquires input data. The evaluation acquiring step acquires any one of a positive evaluation indicating that content of the input data coincides with the label, a negative evaluation indicating that content of the input data does not coincide with the label, and an ignorable evaluation indicating exclusion from a training target label, for each label regarding the input data acquired in the input data acquiring step. The training data creating step associates the input data acquired in the input data acquiring step with the evaluation for each label acquired in the evaluation acquiring step to create the training data.

An effect of the method for creating training data is the same as the effect of the training data creation device described above.

A training program according to another aspect of the invention is a training program causing a computer to operate to train a neural network by means of a backpropagation algorithm, the neural network using a plurality of labels to classify recognition target data. The training program causes the computer to function as a training data acquisition unit, an input layer, an intermediate layer, an output layer, and a backpropagation unit. The training data acquisition unit acquires training data, the training data including input data and an evaluation for each label associated with the input data in advance. The input data is associated with any one of a positive evaluation indicating that content of the input data coincides with the label, a negative evaluation indicating that content of the input data does not coincide with the label, and an ignorable evaluation indicating exclusion from a training target label, for each label. The input layer acquires, as a score, the input data included in the training data acquired by the training data acquisition unit. The intermediate layer performs an arithmetic operation on the score acquired by the input layer by use of a weight coefficient. The output layer outputs a recognition score for each label by use of the score subjected to the arithmetic operation by the intermediate layer. The backpropagation unit adjusts the weight coefficient for the intermediate layer by use of the recognition score for each label output by the output layer and a ground-truth score of the evaluation for each label. The backpropagation unit adjusts the weight coefficient for the intermediate layer such that the recognition score of the label with the positive evaluation or the negative evaluation comes closer to the ground-truth score of the positive evaluation or the negative evaluation, and makes the recognition score of the label with the ignorable evaluation not affect the adjustment of the weight coefficient for the intermediate layer.

An effect of the training program is the same as the effect of the training device described above.

A training data creation program according to another aspect of the invention is a training data creation program causing a computer to operate to create training data for a training device, the training device training a neural network by means of a backpropagation algorithm, the neural network using a plurality of labels to classify recognition target data. The training data creation program causes the computer to function as an input data acquisition unit, an evaluation acquisition unit, and a training data creation unit. The input data acquisition unit acquires input data. The evaluation acquisition unit acquires any one of a positive evaluation indicating that content of the input data coincides with the label, a negative evaluation indicating that content of the input data does not coincide with the label, and an ignorable evaluation indicating exclusion from a training target label, for each label regarding the input data acquired by the input data acquisition unit. The training data creation unit associates the input data acquired by the input data acquisition unit with the evaluation for each label acquired by the evaluation acquisition unit to create the training data.

An effect of the training data creation program is the same as the effect of the training data creation device described above.

A terminal device according to another aspect of the invention is a terminal device capable of communicating with the training device described above, comprising a recognition target data acquisition unit acquiring the recognition target data, a recognition unit giving the label representing content of the recognition target data to the recognition target data by use of a parameter trained by the training device, an operation reception unit accepting a user operation determining a private label to be given to the recognition target data acquired by the recognition target data acquisition unit, and a label editing unit giving the private label to the recognition target data, based on the user operation accepted by the operation reception unit.

The terminal device can give other label (private label) than the label given based on a training result of the training device. Therefore, the terminal device can improve user's convenience.

In an embodiment, the terminal device may further comprise a label presentation unit configured to present the private label to a user based on a history of giving date and time and a reference date and time of the private label given by the label editing unit. The configuration like this allows the terminal device to present the private label to a user depending on an action of the user.

In an embodiment, the terminal device may further comprise a label presentation unit configured to present the private label to a user based on accompanying information given in generating the recognition target data. The configuration like this allows the terminal device to present the private label to the user depending on a situation in generating the recognition target data.

In an embodiment, in the terminal device, the operation reception unit accepts a user operation for attaching a comment to share the recognition target data with another person, and the terminal device may comprises a determination unit configured to determine the recognition target data to be shared, based on the user operation accepted by the operation reception unit, an analysis unit configured to analyze content of the comment attached to the recognition target data determined by the determination unit, and a label presentation unit configured to present the private label to a user, based on an analysis result by the analysis unit. The configuration like this allows the terminal device to present the private label to a user depending on the comment given by the user.

In an embodiment, the terminal device may be configured to be capable of communicating with a language server, and further comprise a list output unit configured to output a list of the given private label to the language server, a relationship acquisition unit configured to acquire a relationship between a representative label and the given private label from the language server, and a suggestion unit configured to suggest to a user to alter the private label to the representative label, based on the relationship acquired by the relationship acquisition unit, in which the language server includes a list acquisition unit configured to acquire the list from the terminal device, a collection unit configured to collect the private label into a group, based on the list acquired by the list acquisition unit, a representative label selection unit configured to select the representative label for the group collected into by the collection unit, and a representative label output unit configured to output a relationship between the representative label and the given private label to the terminal device, based on a selection result by the representative label selection unit. The configuration like this allows the terminal device to prompt the user to organize the private labels.

A threshold value changing device according to another aspect of the invention is a device changing a threshold value in the terminal device. The terminal device acquires recognition target data, outputs by a neural network a recognition score indicating a degree of coincidence between content of the recognition target data and a predetermined label, and outputs a recognition result indicating whether or not the content of the recognition target data coincides with the predetermined label by use of a threshold value set in advance for the recognition score and the recognition score. The threshold value changing device comprises an evaluation data acquisition unit, a terminal data acquisition unit, a recognition score acquisition unit, a computation unit, and a changing unit. The evaluation data acquisition unit acquires evaluation data including input data and a truth evaluation of the predetermined label, the truth evaluation being associated with the input data, and indicating whether content of the input data coincides with the predetermined label to have a positive evaluation, or the content of the input data does not coincide with the predetermined label to have a negative evaluation. The terminal data acquisition unit acquires a ratio between a positive evaluation and a negative evaluation of data associated with the terminal device. The recognition score acquisition unit acquires the recognition score of the predetermined label for the input data from the neural network (e.g., neural network for recognition) or a neural network (e.g., neural network for training) having a weight coefficient the same as a weight coefficient for the former neural network. The computation unit computes the number of pieces of data recognized as the positive evaluation for the input data with the truth evaluation being the positive evaluation and the number of pieces of data recognized as the positive evaluation for the input data with the truth evaluation being the negative evaluation by use of the recognition score of the predetermined label acquired by the recognition score acquisition unit and the threshold value to compute a precision for the predetermined label using the computed number of pieces of data. The changing unit changes the threshold value by use of the precision computed by the computation unit. The computation unit corrects the number of pieces of data recognized as the positive evaluation for the input data with the truth evaluation being the negative evaluation by use of a ratio between the positive evaluation and the negative evaluation of the evaluation data, and the ratio between the positive evaluation and the negative evaluation of the data associated with the terminal device to compute the precision using the corrected number of pieces of data.

According to the threshold value changing device, the number of pieces of data recognized as the positive evaluation for the input data of the negative evaluation is corrected by use of the ratio between the positive evaluation and the negative evaluation of the evaluation data, and the ratio between the positive evaluation and the negative evaluation of the data associated with the terminal device. Then, the threshold value used in the recognition by the terminal device is changed based on the precision for a predetermined label computed by use of the number of pieces of data after correction. In this way, in computing the precision for a predetermined label, with taking into account a distribution of positive and negative data of the evaluation data and a distribution of positive and negative data of the terminal device, the number of pieces of data recognized as the positive evaluation for the input data of the negative evaluation is corrected. For this reason, for example, deviation of the positive and negative data of the terminal device can be reflected to the number of pieces of data with deviation of the positive and negative data of the evaluation data being canceled. Therefore, even if a deviation exists in the positive and negative data of the evaluation data, and there is a difference between the deviation and a deviation of the positive and negative data of the terminal device, this device can make a proper evaluation in conformity to the terminal device, and, as a result, can properly change the threshold value in conformity to the terminal device.

In an embodiment, the computation unit may compute a recall and the precision for the predetermined label. The changing unit may change the threshold value to a recognition score with a harmonic mean between the recall and the precision being maximum. In this case, this device can use the recall and the corrected precision to change the threshold value.

In an embodiment, the terminal data acquisition unit may acquire the ratio between the positive evaluation and the negative evaluation of the data associated with the terminal device, based on the recognition result by the neural network of the terminal device, or a result of annotation by the user of the terminal device. In this case, this device can acquire the deviation of the positive and negative data of the terminal device based on actual data.

In an embodiment, the terminal data acquisition unit acquires the ratio between the positive evaluation and the negative evaluation of the data associated with the terminal device, based on an operation on the terminal device by the user or terminal information. In this case, this device can estimate and acquire the deviation of the positive and negative data of the terminal device.

A threshold value changing device according to another aspect of the invention is a device changing a threshold value in the terminal device. The terminal device acquires recognition target data, outputs by a neural network a recognition score indicating a degree of coincidence between content of the recognition target data and a predetermined label, and outputs a recognition result indicating whether or not the content of the recognition target data coincides with the predetermined label by use of a threshold value set in advance for the recognition score and the recognition score. The threshold value changing device comprises a terminal data acquisition unit, a storage unit, and a changing unit. The terminal data acquisition unit acquires a ratio between a positive evaluation and a negative evaluation of data associated with the terminal device. The storage unit stores a relationship between the ratio and the threshold value. The changing unit changes the threshold value by use of the relationship stored in the storage unit and the ratio acquired by the terminal data acquisition unit.

According to the threshold value changing device, the threshold value is changed by use of the relationship stored in advance between the ratio and the threshold value, and the ratio acquired by the terminal data acquisition unit. In this way, the use of the relationship stored in advance between the ratio and the threshold value can reduce an arithmetic operation load for the threshold value change.

Advantageous Effects of Invention

According to various aspects of the present invention, it is possible to prevent training based on the incorrect evaluation from being performed.

BRIEF DESCRIPTION OF DRAWINGS

FIG. 6 illustrates an example of training data.

FIG. 7 is a diagram illustrating a neural network in a training recognition unit.

FIG. 8 is a flowchart of a method for creating training data according to the embodiment.

FIG. 11 illustrates an example of data stored in a given label storage unit.

FIG. 14 is a table illustrating a process of selecting a private label.

FIG. 22 is a graph illustrating a threshold value of a recognition score.

DESCRIPTION OF EMBODIMENTS

Hereinafter, a description is given of embodiments of the present invention with reference to the drawings. Note that in description of the drawings the same components are designated by the same reference signs, and the duplicated description is omitted.

First Embodiment

A training system 100 (see FIG. 4) according to an embodiment is a system which trains a parameter of a recognition unit 11 (see FIG. 1) recognizing content of recognition target data. The recognition target data is data to be recognized by a computer, and examples of the recognition target data include image data, voice data, and text data. The parameter of the recognition unit 11 is a value used in a recognizing process of recognizing the recognition target data. Hereinafter, a description is given, as an example, of a case that the recognition target data is the image data, and a target to be recognized is content of an image (person, animal, object, scenery, room, etc.).

Figure 1:
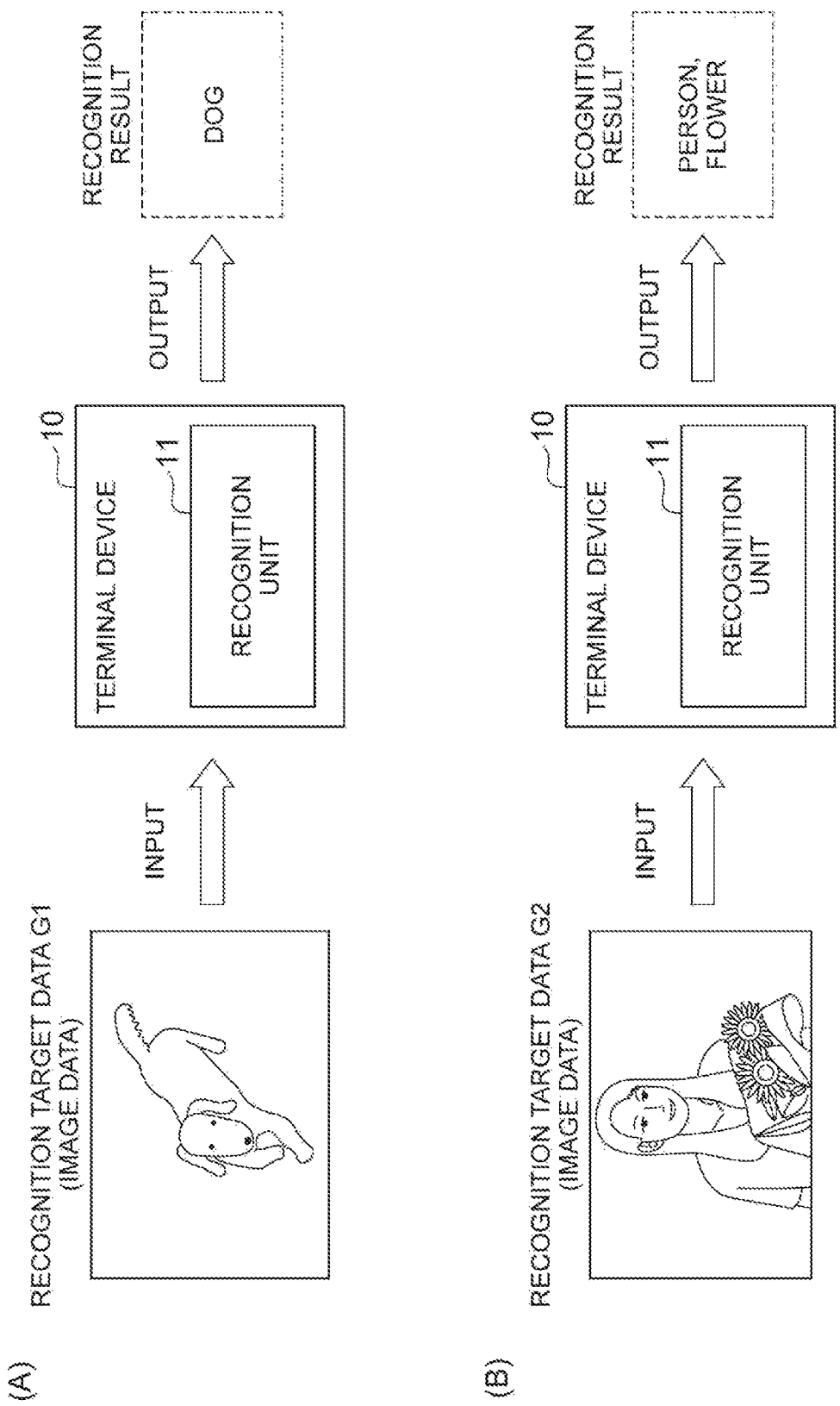
FIG. 1 is a diagram illustrating a recognition unit.

First, the recognition unit 11 is described. FIG. 1 is a diagram illustrating the recognition unit 11. As shown in FIG. 1, the recognition unit 11 is included in a terminal device 10. The recognition unit 11 inputs recognition target data G1 that is the image data, and outputs a recognition result. As shown in (A) of FIG. 1, the recognition target data G1 is image data in which a dog is drawn. The recognition unit 11 inputs the image data (to be more specific, pixel value), and outputs a label representing the content of the image by use of a trained parameter. The label, which is used to classify the content of the recognition target data, is information for identifying a category set in advance by a system user. In the case of (A) of FIG. 1, the recognition unit 11 outputs a label of "dog" as the recognition result. The label is given to the recognition target data G1 by the recognition unit 11. The term giving means making an association, and, for example, only a relationship between the recognition target data G1 and the label may be recorded by means of an association table or the like, or the label may be incorporated into the recognition target data G1 itself. In general, the label being given to the recognition target data is referred to as annotation. The recognition unit 11, because of being capable of inputting the image data to give the label, can automatically classify the image data, or search a web for a desired image.

When there is a plurality of labels set in advance by the system user, there are a single-labeling process of giving the most possible label among the labels to the recognition target data, and a multi-labeling process of giving all labels having a certain possibility to the recognition target data. As shown in (B) of FIG. 1, recognition target data G2 is image data in which a person and flowers are drawn. In a case that the recognition unit 11 performs the single-labeling process, a label of "person" is given to the recognition target data G2 by the recognition unit 11. In a case that the recognition unit 11 performs the multi-labeling process, two labels, the label of "person" and a label of "flower" are given to the recognition target data G2 by the recognition unit 11. The embodiment can be applied to any case of the single-labeling process and the multi-labeling process, but the case of performing the multi-labeling process is described below, as an example.

Figure 2:
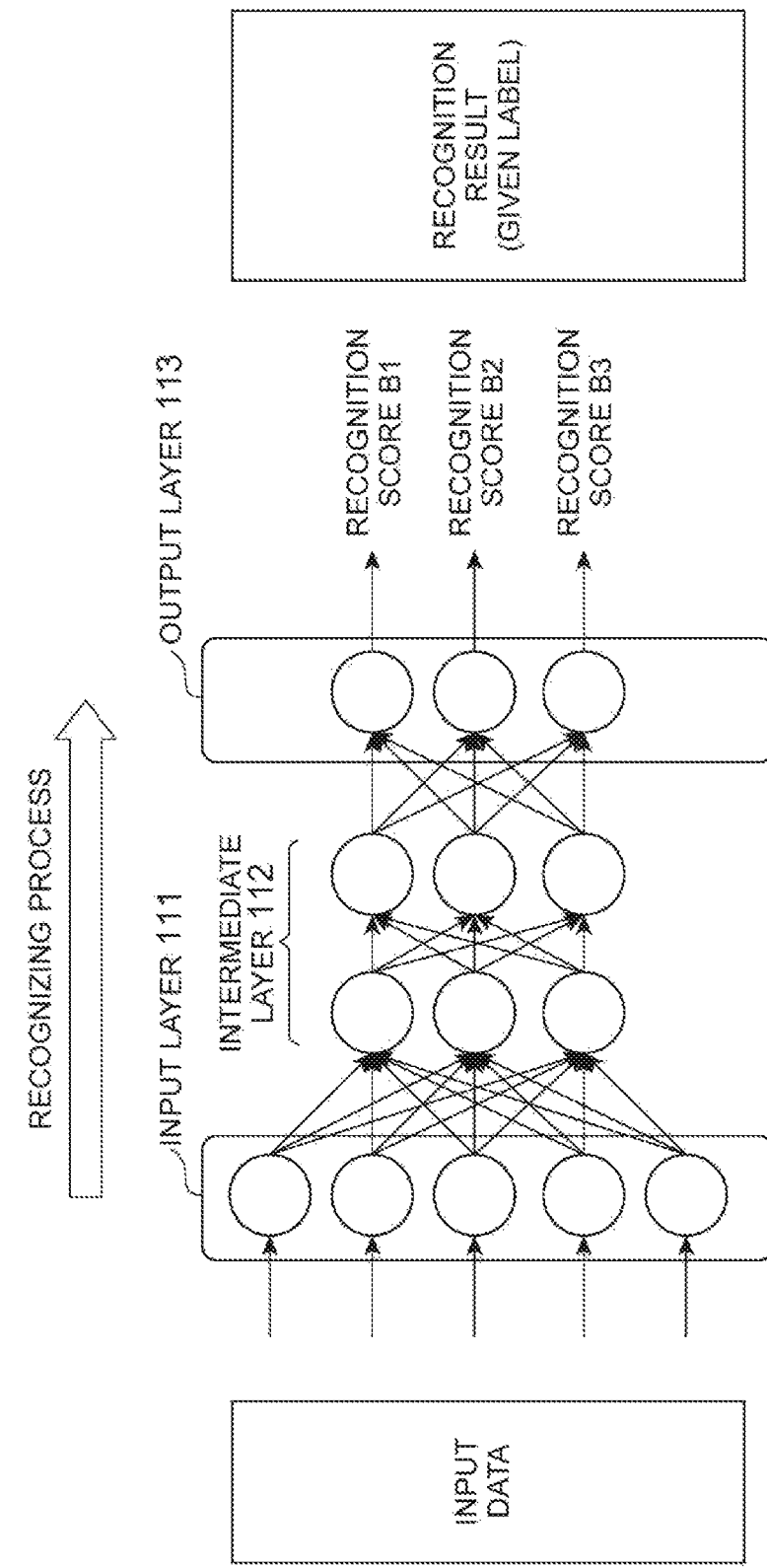
FIG. 2 is a diagram illustrating a neural network in a recognition unit.

Next, a description is given of details of the recognition unit 11. FIG. 2 is a diagram illustrating a neural network in the recognition unit 11. The recognition unit 11 recognizes a label corresponding to the image data by use of the neural network. The neural network is an information processing system which models a cerebral nervous system. As shown in FIG. 2, the neural network in the recognition unit 11 is a so-called hierarchical neural network, in which many artificial neurons illustrated by circles form a hierarchy and are coupled to each other. The hierarchical neural network includes artificial neurons for input, artificial neurons for processing, and artificial neurons for output.

The artificial neurons for input acquire the recognition target data to distribute to the artificial neurons for processing. Hereinafter, a signal itself communicated in the neural network is referred to as a score. The score is a numerical value. The artificial neurons for input are arranged in parallel to form an input layer 111.

The artificial neurons for processing which are connected with the artificial neurons for input process inputs in accordance with functions of the artificial neurons to deliver outputs to other neurons. The artificial neurons for processing are arranged in parallel to form an intermediate layer 112. The intermediate layer 112 may be a plurality of layers. Note that three or more hierarchies of neural networks including the intermediate layer 112 are called a deep neural network.

The artificial neurons for output externally output the recognition score. The number of artificial neurons for output to be prepared is the same as the number of labels. In other words, the recognition score is output for each label in the neural network. In the example in FIG. 2, three artificial neurons are prepared correspondingly to three labels "dog", "person", and "flower". The artificial neurons for output a recognition score B1 corresponding to the label of "dog", a recognition score B2 corresponding to the label of "person", and a recognition score B3 corresponding to the label of "flower". The recognition score is a score representing a recognition possibility, and in a case of training assuming that the positive evaluation is "1" and the negative evaluation "0", the higher the recognition score of the label, the higher the possibility that the label represents the content of the image. The artificial neurons for output are arranged in parallel to form an output layer 113.

The recognition unit 11 uses the recognition score output by the output layer 113 to determine a label to be given. For example, the recognition unit 11 gives the label corresponding to the recognition score equal to or more than a predetermined value to the recognition target data. This allows the recognition target data to be automatically given the label representing the recognition target data. Note that in the case of the single-labeling process, the recognition unit 11 gives the label corresponding to the highest recognition score to the recognition target data.

Figure 3:
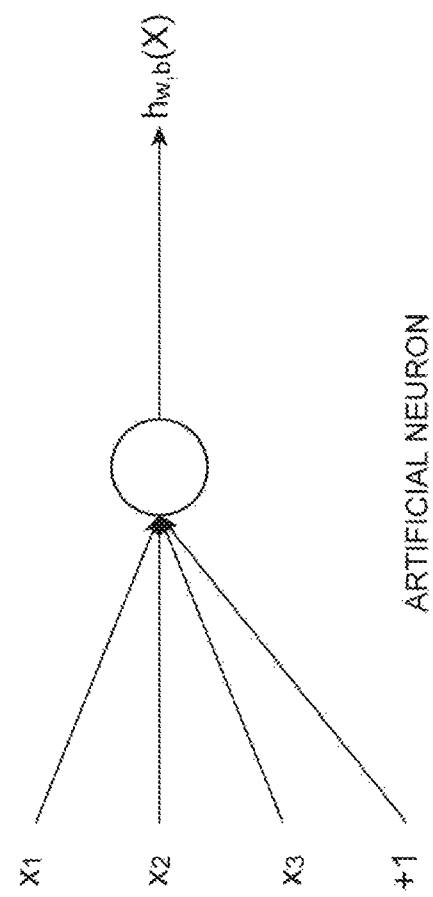
FIG. 3 is a diagram illustrating artificial neurons shown in FIG. 2.

FIG. 3 is a diagram illustrating the artificial neurons shown in FIG. 2. The artificial neurons shown in (A) of FIG. 3 input, $x_1$, $x_2$, and $x_3$, and multiply these by corresponding weight coefficients $w_1$, $w_2$, and $w_3$, respectively. The artificial neurons compute a sum of an integrated value ($x_1 \cdot w_1$, $x_2 \cdot w_2$, $x_3 \cdot w_3$) and a bias value b. The sum is substituted into an activating function to obtain an output of the artificial neurons.

To be more specific, the output of the targeted artificial neurons is as the following mathematical expression.

[Expression 1]

$$h_{w,b}(x)^1 = g\left(\sum_{j=1}^{3} w_i \cdot x_j + b\right) = g(w_1 \cdot x_1 + w_2 \cdot x_2 + w_3 \cdot x_3 + b) \quad (1)$$

Here, g represents an activating function, for example, a sigmoid function.

(B) of FIG. 3 is a diagram illustrating the artificial neurons of N hierarchies (N=3). As shown in (B) of FIG. 3, in a case of three hierarchies, outputs $h_1^{(2)}$, $h_2^{(2)}$, and $h_3^{(2)}$ of the artificial neurons in the second hierarchy are as the following mathematical expressions 3 to 5, respectively. Here, n represents the number of artificial neurons in the targeted hierarchy, $w_{1j}^{(1)}$ represents a weight coefficient for the first artificial neuron in the second hierarchy corresponding to an output of the j-th output in the first hierarchy, and $b_1^{(1)}$ represents a bias value for the first hierarchy.

[Expression 2]

$$h_1^{(2)} = g\left(\sum_{j=1}^{n} w_{1j}^{(1)} \cdot x_j + b_1^{(1)}\right) \quad (3)$$

$$h_2^{(2)} = g\left(\sum_{j=1}^{n} w_{2j}^{(1)} \cdot x_j + b_2^{(1)}\right) \quad (4)$$

$$h_3^{(2)} = g\left(\sum_{j=1}^{n} w_{3j}^{(1)} \cdot x_j + b_3^{(1)}\right) \quad (5)$$

where, $w_{2j}^{(1)}$ represents a weight coefficient for the second artificial neuron in the second hierarchy corresponding to an output of the j-th output in the first hierarchy, $w_{3j}^{(1)}$ represents a weight coefficient for the third artificial neuron in the second hierarchy corresponding to an output of the j-th output in the first hierarchy, $b_2^{(1)}$ represents the second bias value in the first hierarchy, and $b_3^{(1)}$ represents the third bias value in the first hierarchy. Accordingly, an output $h_1^{(3)}$ of the artificial neuron in the third hierarchy is represented by the following mathematical expression 6.

[Expression 3]

$$h_1^{(3)} = g\left(\sum_{j=1}^{n} w_{1j}^{(2)} \cdot h_j^{(2)} + b_1^{(2)}\right) \quad (6)$$

Note that the bias value b is not necessarily needed, and only the integrated value of the output of the artificial neuron and weight coefficient in the previous hierarchy may be used to calculate the output.

The artificial neurons are not limited to the above, and may be those generalized. A general expression for a function of the i-th intermediate layer 112 is as the following mathematical expression 7.

[Expression 4]

$$v^{(i)} = f^{(i)}(x^{(i)}|w^{(i)}, b^{(i)}) \quad (7)$$

Here, $x^{(i)}$ represents an input vector to the intermediate layer 112, $w^{(i)}$ represents a weight parameter vector for the intermediate layer 112, and $b^{(i)}$ represent a bias vector, and $v^{(i)}$ represents an output vector of the intermediate layer 112. Examples of the intermediate layer 112 generally used in image recognition include a fully connected layer and a convolutional layer. The output of the fully connected layer illustrated in FIG. 3 is generally as the following mathematical expression 8.

[Expression 5]

$$v_q^{(i)} = \sum_p \{w_{p,q}^{(i)} \cdot x_p^{(i)}\} + b_q^{(i)} \quad (8)$$

Here, $x_p^{(i)}$ represents the p-th component of the output of the i-th intermediate layer 112, $v_q^{(i)}$ represents the q-th component of the output of the intermediate layer 112, and $w_{p,q}^{(i)}$ represents p, q components of the weight coefficient for the intermediate layer 112. The output of the convolutional layer is as the following mathematical expression 9.

[Expression 6]

$$v_{q,(r,s)}^{(i)} = \sum_p \sum_{r'} \sum_{s'} \{w_{p,q,(r',s')}^{(i)} \cdot x_{p,(r+r',s+s')}^{(i)}\} + b_q^{(i)} \quad (9)$$

Here, $x_{p,(r,s)}^{(i)}$ represents a (r, s) component on the p-th channel of the input of the i-th intermediate layer 112, $v_{q,(r,s)}^{(i)}$ represents a (r, s) component on the q-th channel of the output of the intermediate layer 112, and $w_{p,q,(r',s')}^{(i)}$ represents a weight coefficient for a convolutional filter of the intermediate layer 112. r' and s' vary from 0 to values (width−1), and (height−1) of the convolutional filter. By repeating the calculation of the intermediate layer 112 and activating function $g^{(i)}$ as above, the output of the intermediate layer immediately before the output layer 113 is as the following mathematical expression 10.

[Expression 7]

$$h^{(N)} = g^{(N)}(f^{(N)}(g^{(N-1)}(f^{(N-1)}(\quad . \quad . \quad . \quad |w^{(N-1)}, b^{(N-1)})|w^{(N)}, b^{(N)})) \quad (10)$$

The weight coefficient and bias value described above are those trained by the training system 100 described later, and delivered to the recognition unit 11. In other words, the training system 100 is a system training the weight coefficient and bias value which make a feature amount of the recognition target data correspond to the label indicating the content thereof. Note that when the recognition unit 11 does not use the bias value b, the training system 100 trains only the weight coefficient.

Figure 4:
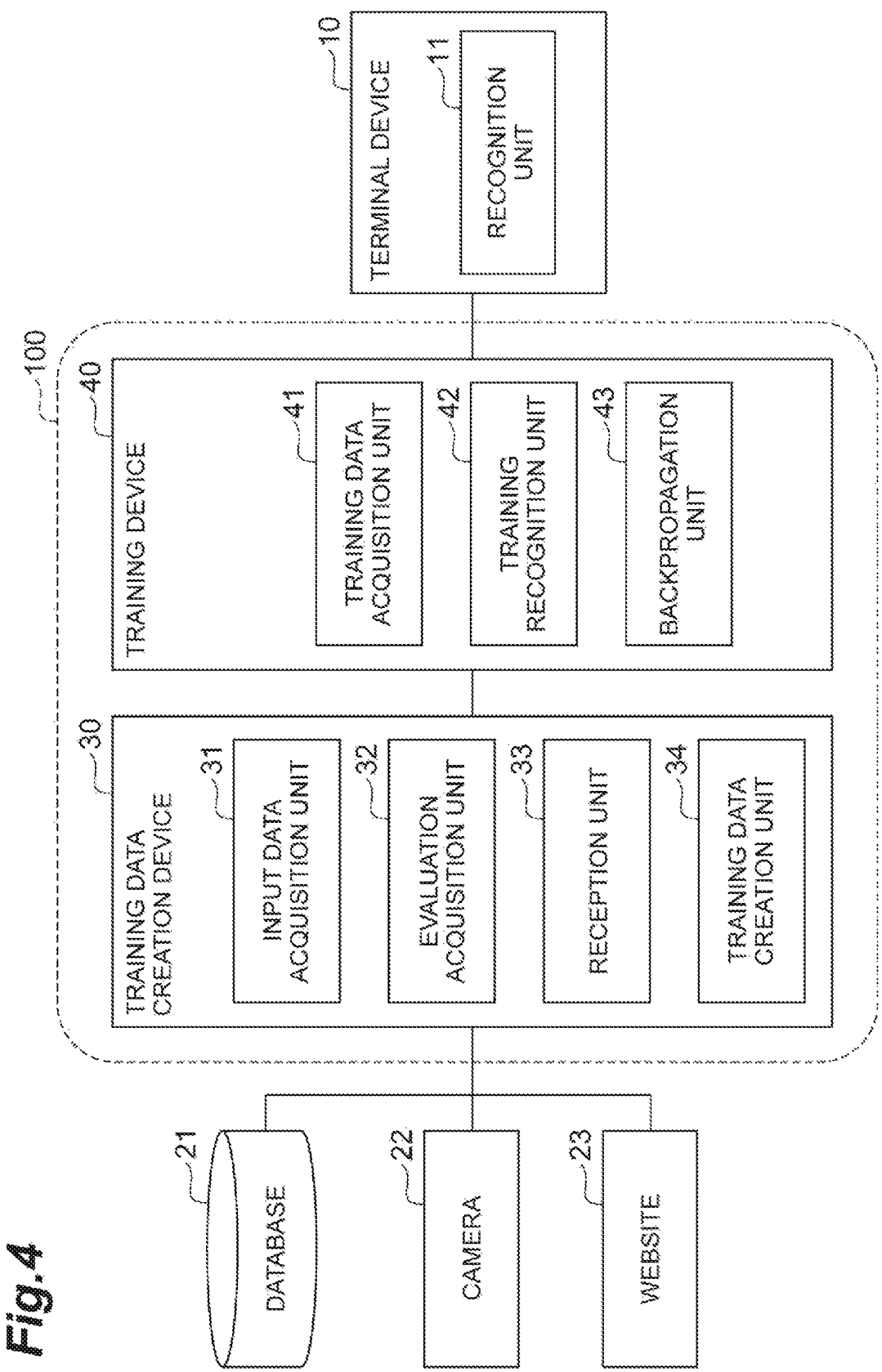
FIG. 4 is a functional block diagram of a training system according to an embodiment.

FIG. 4 is a functional block diagram of the training system 100 according to the embodiment. The training system 100 collects and trains the image data, and provides the trained weight coefficient and bias value to the terminal device 10. The training system 100, which is connected with a database 21 storing the image data, a camera 22 generating the image data, a website 23 from which the image data can be downloaded, and the like, can acquire the image data that is the input data for training. Of course, the training system 100 may be connected to an external storage medium to acquire the image data, or receive the image data via communication, and is not limited to the aspect of image data acquisition.

Figure 5:
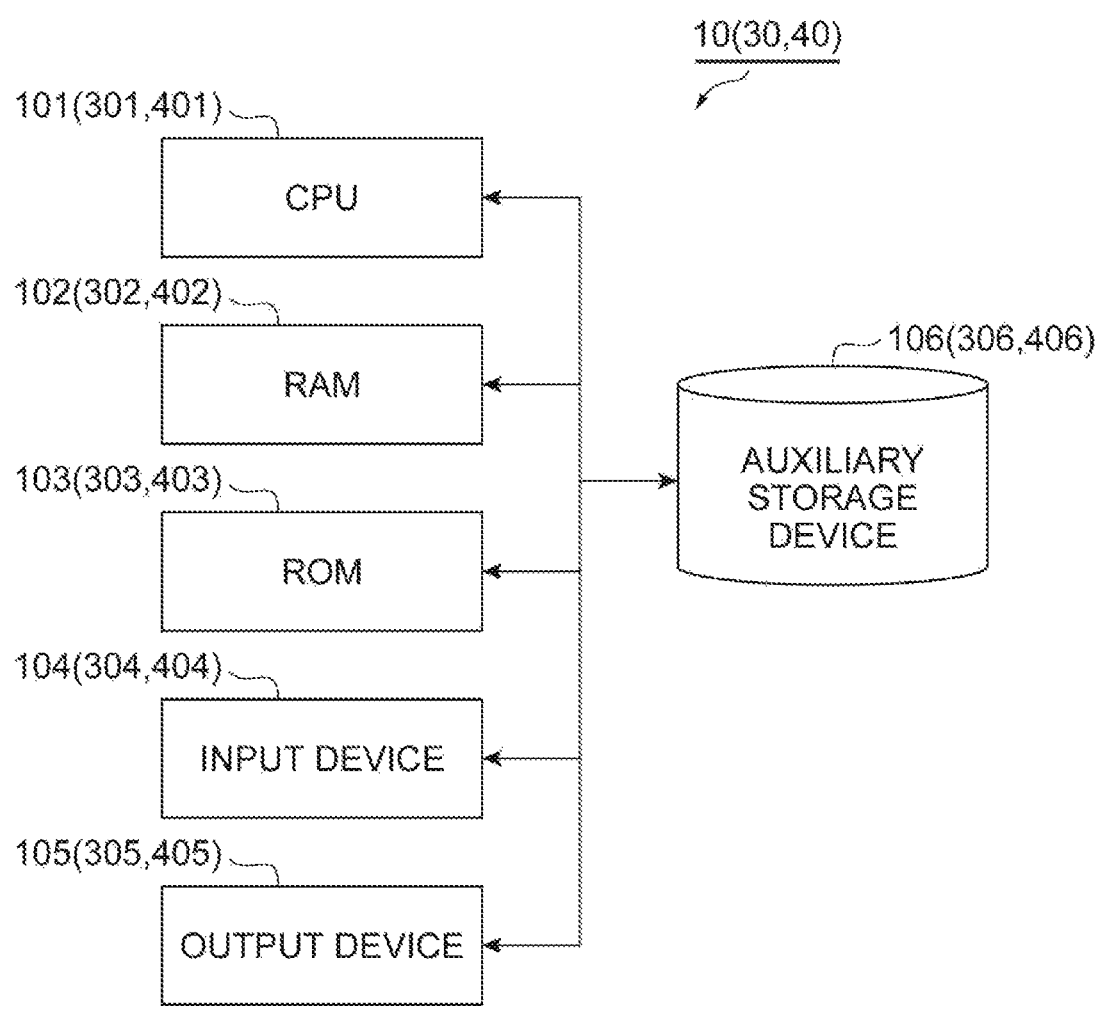
FIG. 5 is s block diagram showing a hardware configuration of a device shown in FIG. 4.

First, a description is given of hardware of the terminal device 10, and a training data creation device 30 and training device 40 included in the training system 100. FIG. 5 is s block diagram showing a hardware configuration of the device shown in FIG. 4. As shown in FIG. 5, the terminal device 10 is configured physically as an ordinary computer system including a CPU (Central Processing Unit) 101, a main memory such as a RAM (Random Access Memory) 102 and a ROM (Read Only Memory) 103, an input device 104 such as a touch panel and a keyboard, an output device 105 such as a display, an auxiliary storage device 106 such as hard disk, and the like. Functions of the terminal device 10 are implemented by that the CPU 101 reads predetermined computer software into the hardware such as RAM 102 and ROM 103 to cause the input device 104 and output device 105 to operate under control of the CPU 101, and to read and write data from and into the main memory or the auxiliary storage device 106.

The hardware of the training data creation device 30 and training device 40 can be also configured by the hardware the same as the terminal device 10. Specifically, the training data creation device 30 is configured physically as an ordinary computer system including a CPU 301, a main memory such as a RAM 302 and a ROM 303, an input device 304, an output device 305, an auxiliary storage device 306, and the like. The training device 40 is configured physically as an ordinary computer system including a CPU 401, a main memory such as a RAM 402 and a ROM 403, an input device 404, an output device 405, an auxiliary storage device 406, and the like.

Next, a description is given of functions of the training system 100. As shown in FIG. 4, the training system 100 includes the training data creation device 30 and the training device 40. The training data creation device 30 creates training data to provide to the training device 40, the training device 40 using the training data in training. The training data includes data the same in the recognition target as data to be processed, and the evaluation of the label corresponding to the relevant data. The training data creation device 30 includes an input data acquisition unit 31, an evaluation acquisition unit 32, a reception unit 33, and a training data creation unit 34.

The input data acquisition unit 31 acquires the input data. The input data acquisition unit 31 acquires the input data for training from the database 21, the camera 22, the website 23, a built-out storage medium, and the like. The input data is data used for training, and is data the same in the recognition target as the data to be processed. Here, the input data is the image data. The input data is data to be subjected to the evaluation of a plurality of labels set in advance. The input data may be already subjected to the evaluation of some labels, or no evaluation. In other words, the input data may be already given some labels. Here, the input data includes at least the label on which determination whether to be given is not made.

The evaluation acquisition unit 32 acquires any one of a "positive evaluation" indicating that the content of the input data coincides with the label, a "negative evaluation" indicating that the content of the input data does not coincide with the label, and an "ignorable evaluation" indicating exclusion from a training target label, for each label regarding the input data acquired by the input data acquisition unit 31. A case that the evaluation of a label is the positive evaluation means that the content of the input data belongs to a category represented by the label. A case that the evaluation of a label is the negative evaluation means that the content of the input data does not belong to a category represented by the label. A case that the evaluation of a label is the ignorable evaluation means that the relevant label is excluded from the training target label. In this way, the evaluation acquisition unit 32 includes not only the "positive evaluation" and the "negative evaluation" but also the "ignorable evaluation" as options of those to be acquired.

The evaluation acquisition unit 32 acquires, as the evaluation of the label, content determined by the annotator that is a person. As shown in FIG. 4, the training data creation device 30 includes a reception unit 33 accepting a user operation specifying the evaluation of the label. The user operation is an operation by the annotator. As a more specific example, the user operation is an operation to select any one of the "positive evaluation", the "negative evaluation", and the "ignorable evaluation" with respect to a label, or an operation to exclude two evaluations with respect to a label. The reception unit 33 acquires to the evaluation acquisition unit 32 a signal regarding the user operation. The evaluation acquisition unit 32 acquires the evaluation of the label specified by the user operation accepted by the reception unit 33.

The user operation may include an operation by the user of the terminal device 10. For example, after the user actually operates the recognition unit 11, the user performs the user operation determining the evaluation. The terminal device 10 transmits the user operation and the input data to the training data creation device 30. The evaluation acquisition unit 32 determines the evaluation of the label of the input data, based on the acquired user operation. Since the user using the recognition unit 11 can feedback the result in this way, accuracy of the recognition unit 11 is improved by re-training. In other words, the configuration like this can realize a user intervening type of interactive training to improve the accuracy of training.

The evaluation acquisition unit 32 may acquire the evaluation of the label already associated with the input data as it is. For example, when there is the training data regarding the label "dog", the input data thereof is already associated with any one of the "positive evaluation", the "negative evaluation", and the "ignorable evaluation" regarding the label "dog". In the case that there is the evaluation of the label, the evaluation acquisition unit 32 may use the evaluation to accept the user operation described above for a label not evaluated and determine its evaluation. The configuration like this allows new training data to be easily created by use of the existing training data, for example.

The training data creation unit 34 associates the input data acquired by the input data acquisition unit 31 with the evaluation for each label acquired by the evaluation acquisition unit 32 to create the training data. The training data creation unit 34 may gather the input data and the evaluation for each label into one piece data as the training data, or use a table to associate the input data with the evaluation for each label.

FIG. 6 illustrates an example of the training data. As shown in (A) of FIG. 6, each piece of input data T1 to TN (N is a natural number) is associated with a plurality of labels. Here, each piece of the input data T1 to TN is associated with three labels. For example, a first label L1 is a label representing that the content of the image is a "dog", a second label L2 is a label representing that the content of the image is a "person", and a third label L3 is a label representing that the content of the image is a "flower". The training data creation unit 34 makes associations of the evaluations of all labels for each input data. For example, assume that the input data T1 is an image of a dog, in which no person appears. In this case, the evaluation of the first label L1 of positive is stored in the table, and the evaluation of the second label L2 of negative is stored in the table. Note that in a case that whether or not a flower appears in the input data T3 is unknown, or in a case that whether or not a flower appears is not determined (a case that the evaluation acquisition unit 32 cannot acquire the evaluation), the ignorable evaluation is determined, and the evaluation of the third label L3 of ignoring is stored in the table. In this way, each piece of the input data T1 to TN is associated with the evaluations of the respective labels. Note that the evaluation may be indicated by the score, for example, the positive evaluation is "1", and the negative evaluation is "0". The score indicating the evaluation of the input data is referred to as a ground-truth score. (B) of FIG. 6 shows the table shown in (A) of FIG. 6 by means of the score. The ignorable evaluation is associated, as an asterisk, with the input data.

The training data creation unit 34 may make the evaluations of all labels of the input data have the ignorable evaluations, before associating the evaluation of the label acquired by the evaluation acquisition unit 32 with the input data acquired by the input data acquisition unit 31. Specifically, the training data creation unit 34 set all labels to the ignorable evaluation as a default setting, and changes those of which evaluations can be acquired from the ignorable evaluation to the positive evaluation or the negative evaluation. The training data creation unit 34 provides the created training data to the training device 40. For example, the output of the training data creation unit 34 may be stored in a recording medium and the training device 40 made to read a storage medium, or may be transmitted from the training data creation unit 34 to the training device 40 via communication.

The training device 40 includes a training data acquisition unit 41, a training recognition unit 42, and a backpropagation unit 43. The training data acquisition unit 41 acquires the training data created by the training data creation device 30.

The training recognition unit 42 has the same configuration as the recognition unit 11, and includes an input layer 111, an intermediate layer 112, and an output layer 113. The input layer 111 acquires, as a score, the input data included in the training data acquired by the training data acquisition unit 41. The intermediate layer 112 performs an arithmetic operation on the score acquired by the input layer 111 by use of a weight coefficient. The output layer 113 outputs a recognition score for each label by use of the score subjected to the arithmetic operation by the intermediate layer 112.

The backpropagation unit 43 adjusts the weight coefficient for the intermediate layer 112 by use of the recognition score for each label output by the output layer 113 and a ground-truth score of the evaluation for each label. FIG. 7 is a diagram illustrating a neural network in the training recognition unit 42. As shown in FIG. 7, the backpropagation unit 43 adjusts the weight coefficients for the intermediate layer 112 such that recognition scores B1 to B3 respectively come closer to ground-truth scores Y1 to Y3 for each label. For example, the backpropagation unit 43 computes respective differences between the recognition scores B1 to B3 and the ground-truth scores Y1 to Y3 for each label. Each of the ground-truth scores Y1 to Y3 is "1" in the case of the positive evaluation or "0" in the case of the negative evaluation. The backpropagation unit 43 adjusts the above described weight coefficients $w_1$, $w_2$, and $w_3$, and bias value b such that the differences between the recognition scores B1 to B3 and the ground-truth scores Y1 to Y3 for each label become smaller. Note that the "difference becomes smaller" means that an error becomes equal to or less than a predetermined value, or that the difference after the adjustment becomes smaller than before the adjustment.

The backpropagation unit 43 determines the weight coefficient $w_1$, $w_2$, or $w_3$, and bias value b at which the difference is the smallest by a gradient method. Such a scheme is also called a backpropagation algorithm. The backpropagation unit 43 determines a minimum value of a square error by the gradient method, for example. The backpropagation unit 43 repeatedly performs a set of updating the weight coefficients $w_1$, $w_2$, and $w_3$, and the bias value b, inputting to outputting of the neural network, and computing the square error. In a case that a variation of the square error becomes equal to or less than a predetermined value, the repeated process ends, and training of the relevant input data ends.

Note that the backpropagation unit 43 does not necessarily need to use the differences between the recognition scores B1 to B3 and the ground-truth scores Y1 to Y3 for each label. For example, a likelihood corresponding to the ground-truth score may be calculated. It means that the larger the likelihood, the closer to the truth the relevant label. The backpropagation unit 43 adjusts the weight coefficient toward a direction where the likelihood becomes larger.

A general expression for the backpropagation is as the following mathematical expression 11 with assuming that an error function (square error, log likelihood function, etc.) computed by the output layer 113 is E(x).

[Expression 8]

$$\frac{\partial E(x)}{\partial w_j^{(i)}} = \sum_k \frac{\partial E(x)}{\partial v_k^{(i)}} \frac{\partial v_k^{(i)}}{\partial w_j^{(i)}} = \sum_k \frac{\partial E(x)}{\partial h_k^{(i)}} \frac{\partial h_k^{(i)}}{\partial v_k^{(i)}} \frac{\partial v_k^{(i)}}{\partial w_j^{(i)}} = \sum_k \frac{\partial E(x)}{\partial h_k^{(i)}} g'^{(i)}(v_k^{(i)}) \frac{\partial f^{(i)}(x^{(i)} \mid w^{(i)}, b^{(i)})_k}{\partial w_j^{(i)}} \quad (11)$$

Here, $w_j^{(i)}$ represents a j component of a weight coefficient for the i-th layer, $h_k^{(i)}$ represents the k-th component of an output vector of the i-th intermediate layer 112, and $g'^{(i)}$ represents a differential of the activating function. The bias value b can be calculated by the similar way.

Each intermediate layer 112 is updated as the following mathematical expression 12 by use of the mathematical expression 11 described above and a piper parameter ε for weight update.

[Expression 9]

$$w_j^{(i)} \leftarrow w_j^{(i)} - \varepsilon \frac{\partial E(x)}{\partial w_j^{(i)}} \quad (12)$$

Note that the following terms in the above mathematical expression 11 cannot be computed only from the i-th layer, and therefore, calculation is needed by use of values for the i+1-th layer.

[Expression 10]

$$\frac{\partial E(x)}{\partial h_k^{(i)}} = \frac{\partial E(x)}{\partial x_k^{(i+1)}}$$

Specifically, the following calculation is to be made.

[Expression 11]

$$\frac{\partial E(x)}{\partial x_k^{(i+1)}} = \sum_l \frac{\partial E(x)}{\partial v_l^{(i+1)}} \frac{\partial v_l^{(i+1)}}{\partial x_k^{(i+1)}} = \sum_l \frac{\partial E(x)}{\partial h_l^{(i+1)}} \frac{\partial h_l^{(i+1)}}{\partial v_l^{(i+1)}} \frac{\partial v_l^{(i+1)}}{\partial x_k^{(i+1)}} =$$

$$\sum_l \frac{\partial E(x)}{\partial h_l^{(i+1)}} g'^{(i+1)}(v_l^{(i+1)}) \frac{\partial f^{(i+1)}(x^{(i+1)} \mid w^{(i+1)}, b^{(i+1)})_l}{\partial x_k^{(i+1)}}$$

Since the calculation is performed in such a way as to propagate the error to an input side from the calculation result on a side closer to the output layer in this way, this way is called the backpropagation.

Here, the backpropagation unit 43 makes the recognition score of the label with the ignorable evaluation not affect the adjustment of the weight coefficient for the intermediate layer. The phrase "not affect the adjustment of the weight coefficient for the intermediate layer" means that the adjustment of the weight coefficient is not differentiated regardless of whether or not the recognition score of the label with the ignorable evaluation is input. For example, the backpropagation unit 43 sets the ground-truth score of the ignorable evaluation to the same value as the recognition score of the label with the ignorable evaluation. This makes the difference between the recognition score and ground-truth score be 0, and therefore, the weight coefficients $w_1$, $w_2$, and $w_3$, and the bias value b are not changed for the label with the ignorable evaluation. Alternatively, the backpropagation unit 43 may change the derivative of the difference between the ground-truth score of the ignorable evaluation and the recognition score of the label with the ignorable evaluation into 0. In other words, assume that the square error is the minimum value for the label with the ignorable evaluation in an evaluation formula of the square error. This makes the difference between the recognition score and ground-truth score be 0, and therefore, the weight coefficients $w_1$, $w_2$, and $w_3$, and the bias value b are not changed for the label with the ignorable evaluation. Alternatively, another layer may be provided in the neural network to block connection of the neural network for the label with the ignorable evaluation. This makes it possible to directly invalidate the backpropagation itself.

Next, a description is given of the operation of the training system 100. First, the operation of the training data creation device 30 is described. FIG. 8 is a flowchart of a method for creating training data according to the embodiment. The flowchart shown in FIG. 8 is performed every time one piece of training data is created.

First, the input data acquisition unit 31 in the training data creation device 30 acquires the input data, as an input data acquiring process (S10: an input data acquiring step). Hereinafter, a description is given of a case that the input data acquisition unit 31 acquires the input data T3, as an example. Next, the evaluation acquisition unit 32 in the training data creation device 30 acquires any one of the "positive evaluation", the "negative evaluation", and the "ignorable evaluation" for each label regarding the input data T3 acquired in the input data acquiring process (S10), as an evaluation acquiring process (S12: an evaluation acquiring step). For example, the evaluation acquisition unit 32 acquires the "negative evaluation" as the evaluation of the first label L1 representing that the content of the image is a "dog", the "ignorable evaluation" as the evaluation of the second label L2 representing that the content of the image is a "person", and the "ignorable evaluation" as the evaluation of the third label L3 representing that the content of the image is a "flower". Note that the evaluation acquisition unit 32 may use the user operation accepted by the reception unit 33 to acquire the evaluation.

Next, the training data creation unit 34 in the training data creation device 30 associates the input data acquired in the input data acquiring process (S10) with the evaluation for each label acquired in the evaluation acquiring process (S12) to create the training data, as a training data creating process (S14: a training data creating step). This makes the input data T3 be associate with "negative", "ignorable", and "ignorable", and be one piece of training data, as shown in (A) of FIG. 6. When the process at S14 is completed, the process shown in FIG. 8 ends.

Figure 9:
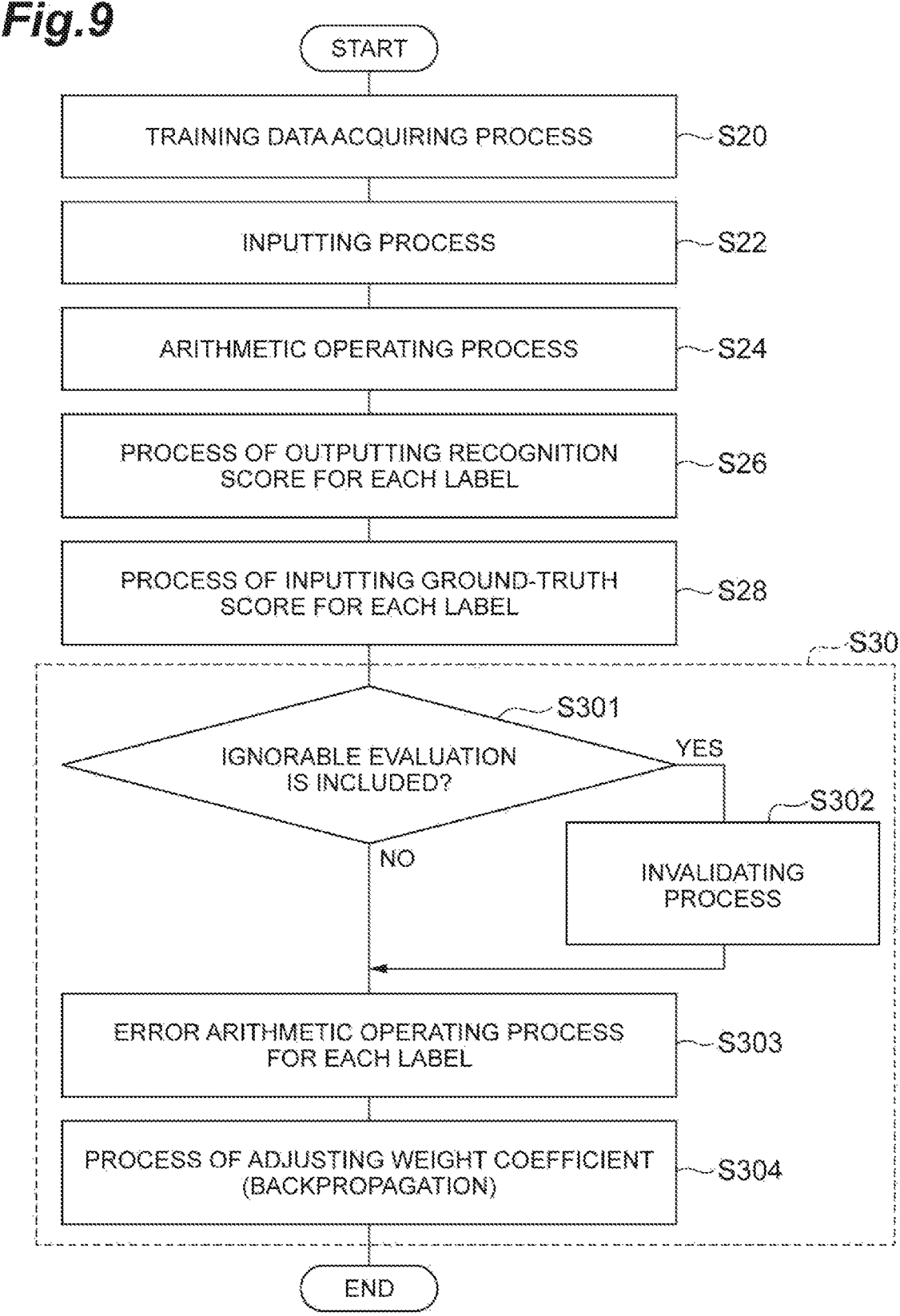
FIG. 9 is a flowchart of a method for training according to the embodiment.

Next, the operation of the training device 40 is described. FIG. 9 is a flowchart of a method for training according to the embodiment. The flowchart shown in FIG. 9 illustrates a flow of training using one piece of training data.

First, the training data acquisition unit 41 in the training device 40 acquires the training data, as a training data acquiring process (S20: a training data acquiring step). Next, the input layer 111 in the training device 40 acquires the input data included in the training data, as an inputting process (S22: an inputting step). Next, the intermediate layer 112 in the training device 40 performs an arithmetic operation based on the function of the artificial neurons, as an arithmetic operating process (S24: an arithmetic operating step). Then, the output layer 113 in the training device 40 outputs the recognition score for each label, as an outputting process (S26: an outputting step). Next, the backpropagation unit 43 in the training device 40 inputs the ground-truth score for each label acquired in the training data acquiring process (S20), as a ground-truth score inputting process (S28: a ground-truth score inputting step). Next, the backpropagation unit 43 performs processes at S301 to S304, as a back-propagating process (S30: a backpropagation step).

The backpropagation unit 43 determines whether or not the ground-truth score input in the ground-truth score inputting process (S28) includes the ignorable evaluation, as an ignorable evaluation determining process (S301). For example, assume that the input data T1 shown in (B) of FIG. 6 is a training target. As shown in (B) of FIG. 6, the third label L3 corresponding to the input data T1 is "asterisk" representing the ignorable evaluation. In this case, the backpropagation unit 43 performs an invalidating process (S302). The backpropagation unit 43 makes, as the invalidating process (S302), the recognition score output in the outputting process (S26) be the ground-truth score of the ignorable evaluation determined in the ignorable evaluation determining process (S301). For example, when the input data T1 is a training target, the recognition score B3 is substituted into the ground-truth score for the third label L3.

In a case that the invalidating process (S302) is completed, or in a case that the ignorable evaluation determining process (S301) determines the ignorable evaluation is not included in the ground-truth score, the backpropagation unit 43 performs an error arithmetic operating process (S303). The backpropagation unit 43 computes a difference between the recognition score output in the outputting process (S26) and the ground-truth score, as an example of the error arithmetic operating process (S303). Then, the backpropagation unit 43 adjusts the weight coefficient $w_1$, $w_2$, and $w_3$, and the bias value b such that an evaluation function of the error becomes a minimum value, as an adjusting process (S304). When the adjusting process (S304) is completed, the training process shown in FIG. 9 ends.

Next, a description is given of a training data creation program causing to function as the training data creation device 30, and a training program causing to function as the training device 40. The training data creation program includes a main module, an input data acquisition module, an evaluation acquisition module, an acceptance module, and a training data creation unit module. The main module is a part for collectively controlling the device. The functions realized by performing the input data acquisition module, evaluation acquisition module, acceptance module, and training data creation module are respectively similar to the functions of the above described input data acquisition unit 31, evaluation acquisition unit 32, reception unit 33, and training data creation unit 34 of the training data creation device 30.

The training program includes a main module, a training data acquisition module, a training recognition module, and a backpropagation module. The main module is a part for collectively controlling the device. The functions realized by performing the training data acquisition module, training recognition module, and backpropagation module are respectively similar to the functions of the above described training data acquisition unit 41, training recognition unit 42, and backpropagation unit 43 of the training device 40.

The training data creation program and the training program are provided by way of a non-transitory record such as the ROM or a semiconductor memory medium, for example. The training data creation program and the training program may be provided through a communication of a network or the like.

As described above, in the training system 100 according to the embodiment, any one of the positive evaluation, the negative evaluation, and the ignorable evaluation is acquired as the evaluation of the label for each label by the training data creation device 30 to create the training data. In other words, the training system 100 can train by use of the training data capable of including a new evaluation, "ignorable evaluation", besides the "positive evaluation" and the "negative evaluation". The training device 40 adjusts the weight coefficient for the intermediate layer 112 such that the recognition score of the label with the positive evaluation or the negative evaluation comes closer to the ground-truth score of the positive evaluation or the negative evaluation, and makes the recognition score of the label with the ignorable evaluation not affect the adjustment of the weight coefficient for the intermediate layer 112. Therefore, it is possible to improve accuracy performance of the recognition unit 11 for the label with the positive evaluation or the negative evaluation, and to not affect the accuracy performance of the recognition unit 11 for the label with the ignorable evaluation. In a framework of related art that the positive evaluation or negative evaluation should be necessarily given to the input data, an approach has been used in which the evaluation of an incomplete label is made closer to the evaluation of the complete label by estimation or the like. In contrast to this, by introducing a new evaluation, ignorable evaluation, a new approach can be used in which only the correctly given evaluation among the incomplete evaluations is used to train, it is possible to prevent training based on the incorrect evaluation from being performed. Use of the ignorable evaluation can reinforce training only of a specific label.

In the training system 100 according to the embodiment, the back-propagation is performed also on the label with the ignorable evaluation, but the weight coefficients $w_1$, $w_2$, and $w_3$, and bias value b for the intermediate layer 112 are not adjusted. Therefore, the back-propagation for the label with the ignorable evaluation can be invalidated without changing a configuration of the neural network or the mathematical expression of the back-propagation by the backpropagation unit 43.

The training system 100 according to the embodiment enables training without forcedly setting a label not evaluated to the positive evaluation or the negative evaluation.

In the training system 100 according to the embodiment, by using the configuration in which the user can change or add the evaluation, it is possible to not only prevent training based on the incorrect evaluation from being performed but also perform training based on a correct evaluation, and as a result, the accuracy performance of the recognition unit 11 can be improved.

In the training system 100 according to the embodiment, all labels may be set to the ignorable evaluation as a default setting, and those of which evaluations can be acquired can be changed from the ignorable evaluation to the positive evaluation or the negative evaluation. Specifically, in a case the annotator works, a need to explicitly specify the ignorable evaluation can be eliminated.

As described above, since a supervised training needs the ground truths of all labels, the training data creation involves a cost. Particularly, in the case of the multi-label, unlike the case of the single label, there is no relationship that when a label has the positive evaluation, other labels have the negative evaluations, and therefore, all labels need to be given either the positive evaluation or the negative evaluation. Further, the training data creation may be performed by a person (annotator) in some cases. The annotator needs to make the evaluation of the label in order to create the training data whether or not he/she is confident of the evaluation of the label. For this reason, training based on the incorrect evaluation may be probably performed. In contrast to this, in the training data creation device 30 according to the embodiment, any of the positive evaluation, the negative evaluation, and the ignorable evaluation is acquired as the evaluation of the label for each label to create the training data. Specifically, the training data creation device 30 can make the training data include a new evaluation, "ignorable evaluation", besides the "positive evaluation" and the "negative evaluation". By introducing a new evaluation, ignorable evaluation, a new approach can be used in which only the correctly given evaluation among the incomplete evaluations is used to train, it is possible to prevent training based on the incorrect evaluation from being performed.

Hereinabove, the present invention is described in detail based on the embodiment thereof. However, the invention is not limited to the above embodiment. The invention can be variously modified within a scope not departing from the gist thereof.

In the embodiment described above, the case that the recognition target data is the image data is described as an example, but the recognition target data may be voice data or character data. Even in a case that such data is targeted, it is possible to prevent training based on the incorrect evaluation from being performed.

In the embodiment described above, the case that the positive evaluation is "1", and the negative evaluation is "0" is described as an example, but an arbitrary value can be set. For example, it may be possible to set the positive evaluation to "0" and the negative evaluation to "1", or set the positive evaluation to "2" and the negative evaluation to "1".

In the embodiment described above, the training data creation device 30 and the training device 40 may be configured as one device.

In the embodiment described above, data preferentially added to the training data may be selected. For example, the training data creation device 30 recognizes a plurality of images each having the label with the ignorable evaluation, and preferentially acquires annotation information regarding the input data of which the recognition score is an intermediate value neither the positive evaluation nor the negative evaluation to create the training data. This makes it possible to prioritize difficult data (having a large amount of information) by the recognition unit 11, and therefore, training efficiency is heightened and an annotation efficiency can be heightened as a result.

In the embodiment described above, an evaluation obtained by averaging the evaluations of a plurality of annotators may be the evaluation of the label. The configuration like this allows a criterion for ambiguity to be considered to enable the training with the incorrect evaluation being reduced, and as a result, the accuracy performance of the recognition unit 11 can be improved.

In the embodiment described above, the labels may be hierarchized. For example, assume that a label in a large classification is "A", and labels in a small classification are "A1", "A2", and "A3". The training device 40 may use a weight coefficient for the label A as a default value for the label in the small classification. In this case, a convergence efficiency of the gradient method can be heightened, and therefore, a training time can be shortened.

In the embodiment described above, the training data creation unit 34 may modify the input data. For example, the training data creation unit 34 may subject the input data to a normalization process (a process of resizing to a certain size, in the case of the image) or the like. Alternatively, the input layer 111 may perform a process of modifying the input data.

In the embodiment described above, the hardware configuration of the terminal device 10, training data creation device 30, and training device 40 is not necessarily configured to be physically one body, and may be constituted by a plurality of devices. Specifically, a plurality of devices may be connected via a network to virtually configure the terminal device 10, the training data creation device 30, and the training device 40.

Hereinafter, further other embodiments are generally described.

Second Embodiment

In the first embodiment, the terminal device 10 gives the label trained by the training system 100. The label in the first embodiment is the label representing the content set in advance, and is common to the terminal device 10 and the training system 100. The label may be common to a plurality of terminal devices 10. In other words, the label in the first embodiment is not a label which is freely set by the user of the like. In the second embodiment, the user is permitted to freely give the label. Hereinafter, the label in the first embodiment is referred to as a public label, and the label freely set by the user is referred to as a private label. In the following description, a description of the content described in the first embodiment is omitted.

Figure 10:
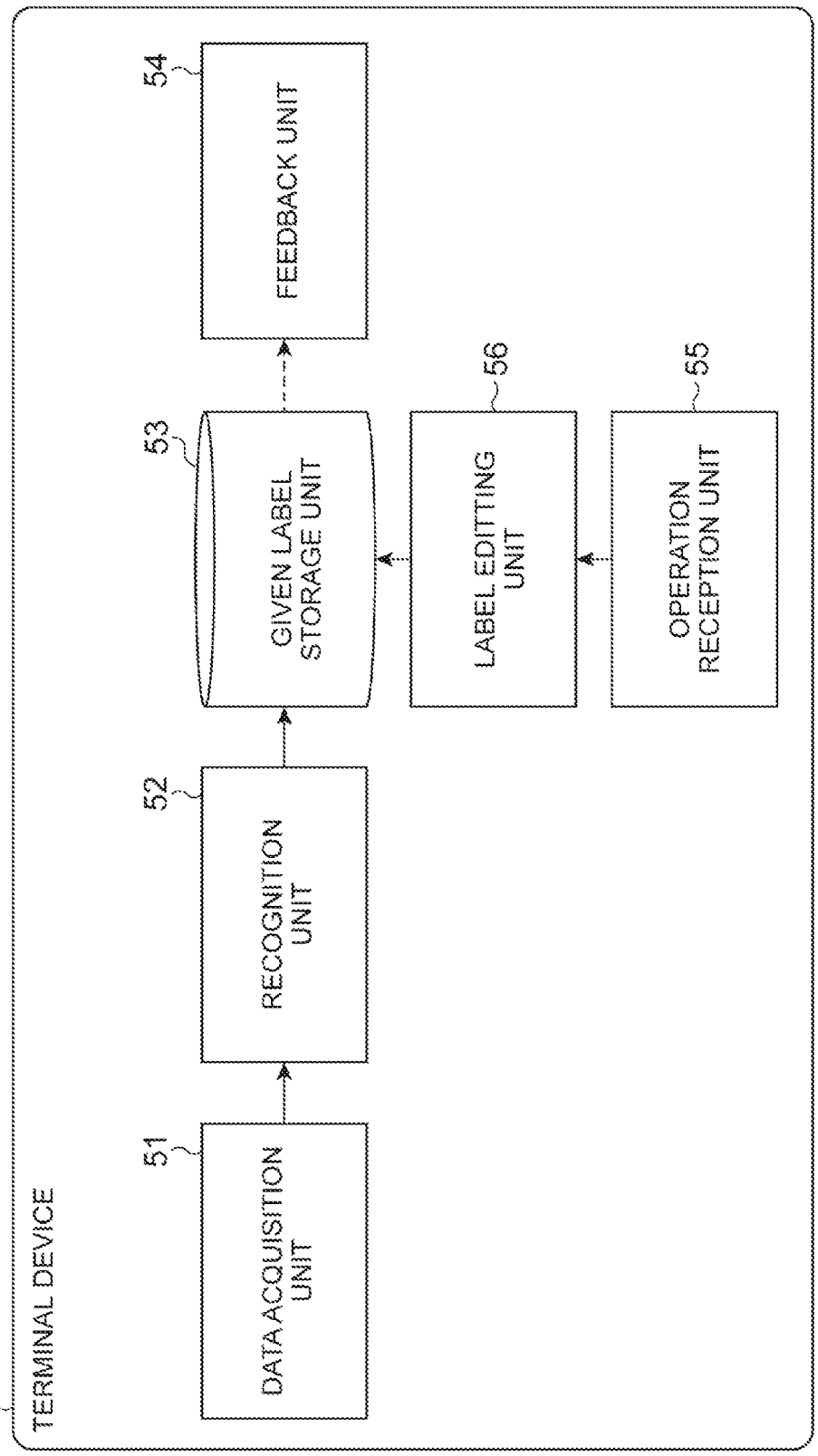
FIG. 10 is a functional block diagram of a terminal device according to a second embodiment.

FIG. 10 is a functional block diagram of a terminal device 50 according to the second embodiment. The terminal device 50 include a data acquisition unit (recognition target data acquisition unit) 51, a recognition unit 52, a given label storage unit 53, a feedback unit 54, an operation reception unit 55, and a label editing unit 56. Hardware of the terminal device 50 is the same as the terminal device 10.

The data acquisition unit 51 acquires the recognition target data. For example, the data acquisition unit 51 acquires the image data stored in a storage medium included in the terminal device 50. The data acquisition unit 51 may acquire the image data via communication.

The recognition unit 52 is the same as the recognition unit 11 in the above described embodiment. The recognition unit 52 gives the public label representing the content of the recognition target data to the recognition target data by use of a parameter trained by the training device 40. Here, as an example, the recognition unit 52 stores the recognition result in the given label storage unit 53. The given label storage unit 53 stores the recognition target data and public label associated with each other.

FIG. 11 illustrates an example of data stored in the given label storage unit 53. As shown in (A) of FIG. 11, the given label storage unit 53 has the recognition target data and the public label associated with each other and stored therein. As an example, the recognition target data is configured to be identifiable by a recognition target data ID. The recognition target data ID is an identifier of the recognition target data. The given label storage unit 53 has the recognition target data ID "1" and the public label "flower, outdoor" associated with each other and stored therein, for example. The given label storage unit 53 has the recognition target data ID "2" and the public label "people" associated with each other and stored therein, for example. The given label storage unit 53 has the recognition target data ID "3" and the public label "people, school, indoor" associated with each other and stored therein, for example. The given label storage unit 53 has the recognition target data ID "4" and the public label "indoor, saucer, people" associated with each other and stored therein, for example.

The recognition unit 52 may further store accompanying information accompanying the recognition target data in the given label storage unit 53. The accompanying information may be information indicating a condition or the like of generating the recognition target data, for example. The accompanying information is embedded in the recognition target data as a part of the recognition target data, or managed as data different from the recognition target data to be associated with the identifier of the recognition target data. The recognition unit 52 acquires the accompanying information based on the recognition target data to further store in the given label storage unit 53.

Examples of the accompanying information include reliability of the public label, positional information in generating the data, and data generation date and time, as an example. The reliability of the public label means the possibility of the public label. The reliability of the public label is a score value when recognized by the recognition unit 52, for example. In the case that the recognition target data is the image data, the accompanying information includes the reliability of the public label, imaging position, imaging date and time, camera information, facial recognition result, or the like. The imaging position is latitude and longitude information, for example, and includes GPS information as a specific example. The imaging date and time includes date and time, day of week, seasons or the like. The camera information includes a focal length, an exposure time, a diaphragm, presence or absence of flash, or the like. The facial recognition result is a recognition result of a facial recognition function the camera has.

Further, the given label storage unit 53 stores a relationship between the recognition target data and the label, and a relationship between the private label and a giving time. The content stored in the given label storage unit 53 is updated by the operation reception unit 55 and the label editing unit 56. The update is a concept including adding, changing, overwriting, deleting, and the like.

The operation reception unit 55 accepts the user operation determining the private label to be given to the recognition target data acquired by the data acquisition unit 51. The user operation is an operation on the terminal device by the user of the terminal device 50. The user operation includes an operation specifying the recognition target data and an operation specifying the private label. The operation specifying the recognition target data is, for example, an operation to select one icon from a list of icons of the recognition target data displayed on a display device or the like. The operation specifying the private label is, for example, an operation to input a label name of the private label, an operation to select one label from a list of the private labels displayed on the display device or the like and input in the past, or the like.

The label editing unit 56 gives the private label to the recognition target data, based on the user operation accepted by the operation reception unit 55. Here, the label editing unit 56 stores the relationship between the recognition target data and the private label in the given label storage unit 53, as an example. For example, the recognition target data ID "4" shown in (A) of FIG. 11 is not given a private label. Assume that in such a situation, the user operation to select the recognition target data ID "4" and the private label "Chinese food" and "friend" is performed by the user. In this case, as shown in (B) of FIG. 11, the recognition target data ID "4" and the private label "Chinese food" and "friend" are associated and stored. At this time, the label editing unit 56 may store also the date and time when the private label is given in the given label storage unit 53. The label editing unit 56 may change the information stored in the given label storage unit 53. In other words, the label editing unit 56 can also alter or delete the private label which the label editing unit 56 gave once.

As described in the first embodiment, the user can alter or delete the given public label. The operation reception unit 55 accepts the user operation to alter or delete the public label given to the recognition target data. The user operation includes an operation specifying the recognition target data, and an operation altering or deleting the public label. The operation specifying the recognition target data is, for example, an operation to select one icon from a list of icons of the recognition target data displayed on a display device or the like. The operation altering or deleting the public label is, for example, and operation to input the label name of the public, an operation to select a delete button, or the like. The label editing unit 56 alters or deletes the public label based on the user operation accepted by the operation reception unit 55.

The feedback unit 54 outputs the altered content to the training data creation device 30 in the case that the public label is altered by the user, as described in the first embodiment. Specifically, the reception unit 33 in the training data creation device 30 accepts the user operation that is an operation on the terminal device 10 by the user. Note that the reception unit 33 may accept the user operation specifying an evaluation of a part of the labels of the input data. In other words, the user does not need to evaluate all labels of the input data. Then, when the evaluation of the label acquired by the evaluation acquisition unit 32 is an evaluation of a part of the labels of the input data, the training data creation unit 34 associates the evaluation of the part of the labels with the input data acquired by the input data acquisition unit 31, and makes evaluations of remaining labels of the input data have the ignorable evaluations. In this way, the public label is altered by the user, and the altered evaluation is retrained, which improves the training efficiency of the training system 100. Note that the feedback unit 54 may be provided as needed.

Figure 12:
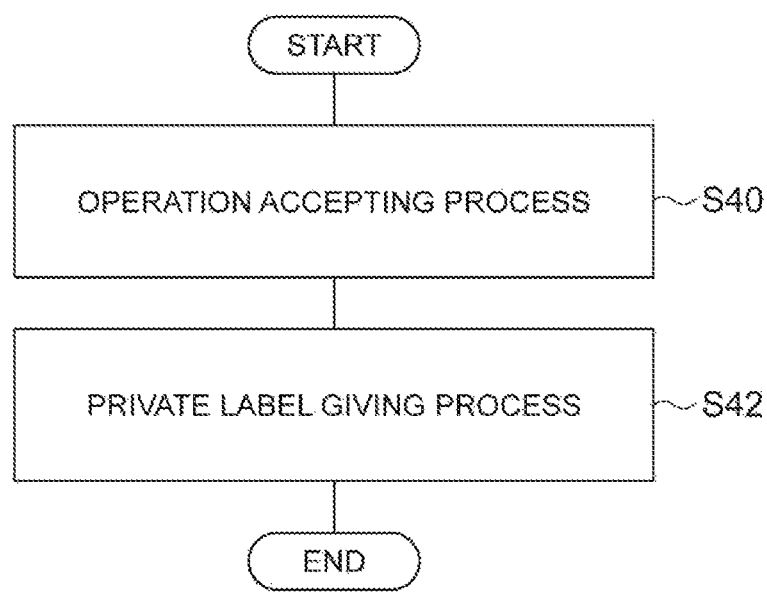
FIG. 12 is a flowchart showing a method for giving a private label.

Next, a method for giving the private label is described. FIG. 12 is a flowchart showing the method for giving the private label. The flowchart shown in FIG. 12 is performed when a label edit button is pushed by the user, for example.

First, the operation reception unit 55 in the terminal device 50 accepts the user operation determining the private label to be given to the recognition target data as an operation accepting process (S40). Next, the label editing unit 56 in the terminal device 50 determines the private label to be given to the recognition target data based on the user operation accepted in the process at S40, and gives the determined private label to the recognition target data, as a private label giving process (S42). When the process at S42 is completed, the method for giving the private label ends.

As described above, the terminal device 50 according to the second embodiment can give other private label than the public label which is given based on the training result of the training device 40. Permitting the private label to be given makes it easy to organize the recognition target data or access to the data access. Therefore, the terminal device 50 can improve user's convenience.

Third Embodiment

A terminal device 50A according to the third embodiment is different in including a label presentation unit 57A and is the same in other points as compared with the terminal device 50 according to the second embodiment. The terminal device 50A according to the third embodiment has an additional function to reduce an effort of the user to give the label by presenting the private label to the user. In the second embodiment, the given label storage unit 53 arbitrarily stores therein the accompanying information and the private label giving date and time, but in the third embodiment, the given label storage unit 53 stores therein at least one of the accompanying information and the private label giving date and time.

Figure 13:
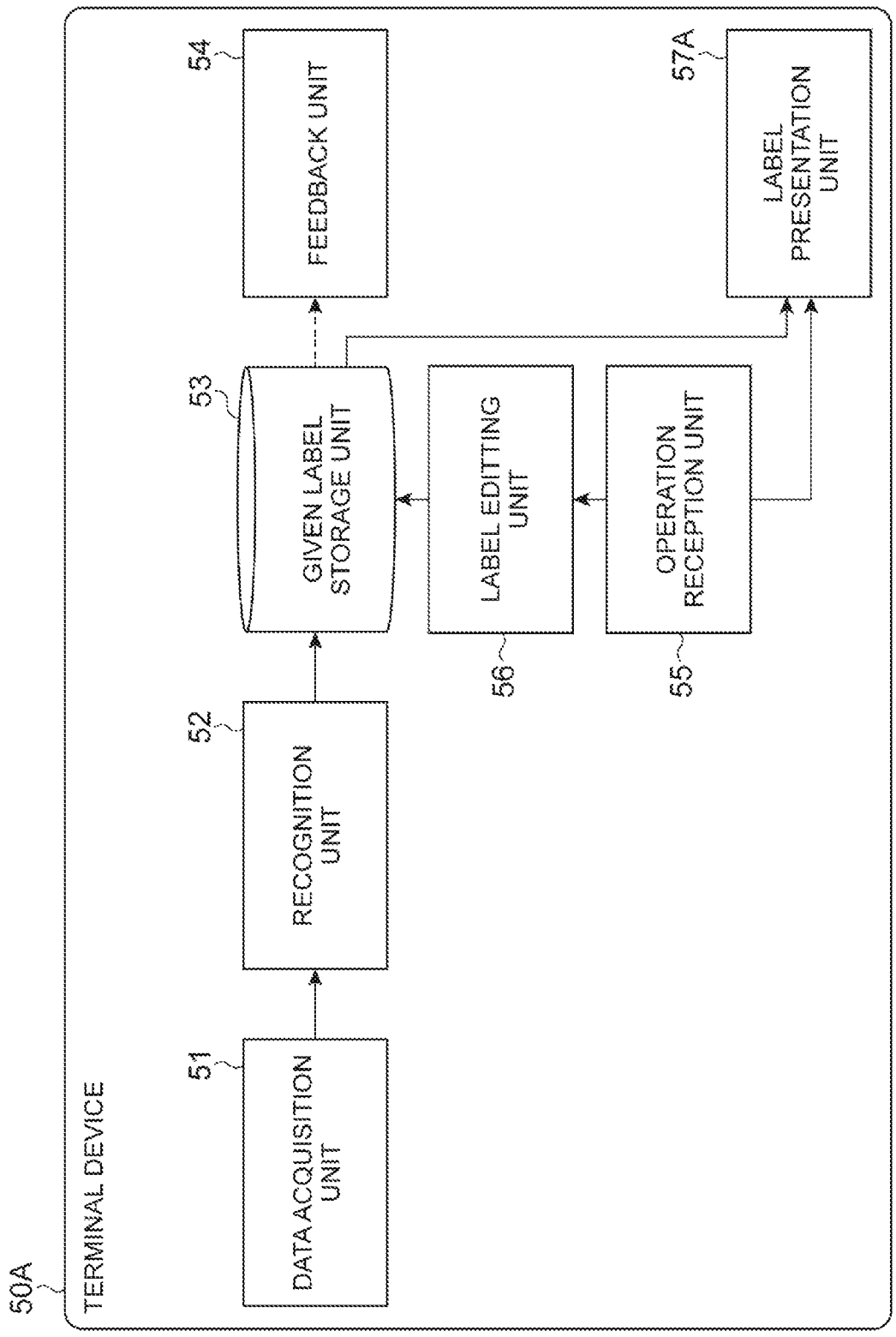
FIG. 13 is a functional block diagram of a terminal device according to a third embodiment.

FIG. 13 is a functional block diagram of the terminal device 50A according to the third embodiment. The terminal device 50A includes the data acquisition unit 51, the recognition unit 52, the given label storage unit 53, the feedback unit 54, the operation reception unit 55, the label editing unit 56, and the label presentation unit 57A. Hardware of the terminal device 50A is the same as the terminal device 10.

The label presentation unit 57A presents the private label to the user. For example, the label presentation unit 57A presents the private label to the user based on a history of giving date and time and a reference date and time of the private label given by the label editing unit 56. The presenting means informing the user. For example, the presenting means displaying a character or icon on the display device. Alternatively, a sound may be output from a speaker or the like, or vibration may be made.

The label presentation unit 57A presents the private label to the user at a time when the operation reception unit 55 accepts the operation on the label edit button, for example. When the label presentation unit 57A acquires a signal indicating that the operation is accepted from the operation reception unit 55, the label presentation unit 57A refers to the given label storage unit 53. As shown in (A) or (B) of FIG. 11, the given label storage unit 53 stores therein the history of giving date and time of the private label given by the label editing unit 56. In other words, the label presentation unit 57A can refer to the given label storage unit 53 to acquire the history of giving date and time of the private label. Then, the label presentation unit 57A acquires the reference date and time. The reference date and time means the date and time used to estimate the private label. For example, the label presentation unit 57A acquires a current date and time based on a real-time clock or the like to use as the reference date and time. Then, the label presentation unit 57A predicts an action of the user from a relationship between the giving date and time and reference date and time for each private label to present the private label.

The label presentation unit 57A refers to the histories for a predetermined time period (or a predetermined number of histories) in the past, computes a difference between the giving date and time and the reference date and time for each history, and performs weighted voting with a weight being an inverse of the difference to determine the private label, as a specific example. FIG. 14 is a table illustrating a process of selecting the private label. In FIG. 14, the private label "A" is associated with the giving date and time "19:30", "19:30", "19:42", "19:53", or "20:04". The private label "B" is associated with giving date and time "20:51" or "20:55". In FIG. 14, information concerning the time is described and information concerning the date is omitted. Here, assume that the reference date and time is "21:02". The label presentation unit 57A computes the difference between the giving date and time and the giving date and time for each history. Specifically, the label presentation unit 57A calculates all fields of the differences shown in FIG. 14. Then, the label presentation unit 57A computes a weight based on the difference to perform the weighted voting. In the example shown in FIG. 14, the number of votes of the private label "A" is "0.06597", and the number of votes of the private label "B" is "0.23377". In the case that history of predetermined time period includes other private labels, the label presentation unit 57A computes the number of votes for other private labels by way of the same scheme. Then, the label presentation unit 57A presents the private label having the most votes to the user. In the example shown in FIG. 14, the label presentation unit 57A presents the private label "B" to the user. Alternatively, the label presentation unit 57A may present a plurality of private labels in descending order of the votes. Other configuration of the terminal device 50A is the same as the terminal device 50.

Figure 15:
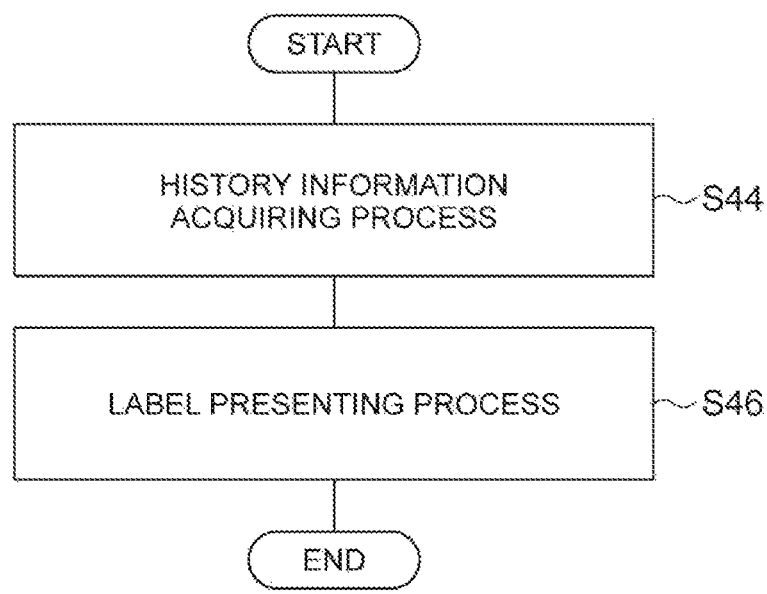
FIG. 15 is a flowchart showing a method for presenting the private label.

Next, a method for presenting the private label is described. FIG. 15 is a flowchart showing a method for presenting the private label. The flowchart shown in FIG. 15 is performed when the label edit button is pushed by the user, for example.

First, the label presentation unit 57A in the terminal device 50A refers to the given label storage unit 53 to acquire history information, as a history information acquiring process (S44). Next, the label presentation unit 57A in the terminal device 50A performs the process, for example, described using FIG. 14 to determine the private label, as a label presenting process (S46). Then, the label presentation unit 57A presents the determined private label to the user. At this time, the public label may be presented at the same time. When the process at S46 is completed, the method for presenting the private label ends.

After presenting the private label, the determination whether or not the label is correct is made by the user, similar to the public label. The label editing unit 56 gives the correct label or deletes the incorrect label by way of the user operation. The label presentation unit 57A may present the private label taking into account the content of labeling in the past, that is, including portions altered by way of the user operation.

Hereinabove, the description is given of the case that the terminal device 50A presents the private label based on the action history of the user, but the terminal device 50A may present the private label based on the accompanying information. In this case, the label presentation unit 57A presents the private label to the user based on the accompanying information given in generating the recognition target data, for example. The terminal device 50A may present the private label to the user by use of both the action history and the accompanying information.

When the label presentation unit 57A acquires a signal indicating that the operation is accepted from the operation reception unit 55, the label presentation unit 57A refers to the given label storage unit 53. As shown in (A) or (B) of FIG. 11, the given label storage unit 53 stores therein the accompanying information associated with the recognition target data. In other words, the label presentation unit 57A can refer to the given label storage unit 53 to acquire the accompanying information. Then, the label presentation unit 57A presents the private label from a relationship between the accompanying information and the private label given in the past.

For example, when the accompanying information includes the reliability of the public label, the label presentation unit 57A specifies another recognition target data given the same public label, and presents the private label given to relevant another recognition target data. For example, when the accompanying information includes the imaging position, the label presentation unit 57A specifies another recognition target data imaged at the same or approximate imaging position, and presents the private label given to relevant another recognition target data. For example, when the accompanying information includes the imaging date and time, the label presentation unit 57A specifies another recognition target data imaged at the same imaging date and time or the same time period of imaging date and time, and presents the private label given to relevant another recognition target data. For example, when the accompanying information includes the camera information, the label presentation unit 57A specifies another recognition target data imaged with the same or similar camera information, and presents the private label given to relevant another recognition target data. For example, when the accompanying information includes the facial recognition result, the label presentation unit 57A specifies another recognition target data having the same facial recognition result, and presents the private label given to relevant another recognition target data.

When there is a plurality of kinds of information as the accompanying information of the recognition target data, the label presentation unit 57A generally makes consideration to determine the private label to be presented. For example, the label presentation unit 57A may determine the private label to be presented based on the weighted voting.

Alternatively, the label presentation unit 57A may use a predefined relationship between the accompanying information and an anticipated situation to determine the private label to be presented without using the relationship between the accompanying information and the private label given in the past. The predefined relationship between the accompanying information and the anticipated situation is stored in advance in the database or the like before performing the process. Such a relationship may be derived by a general rule or an experimental rule. The predefined relationship between the accompanying information and the anticipated situation like this is described using the camera information as an example. For example, in a case that the focal length as the camera information is short, there is a high possibility of imaging a still life or a portrait. Alternatively, in a case that the focal length that is the camera information is long, there is a high probability of imaging a scenery. Alternatively, in a case that an aspect ratio of the camera information is equal to or higher than a predetermined value, there is a high probability of panorama imaging. In this way, the label presentation unit 57A may present the private label based on the predefined relationship between the accompanying information and the anticipated situation.

Figure 16:
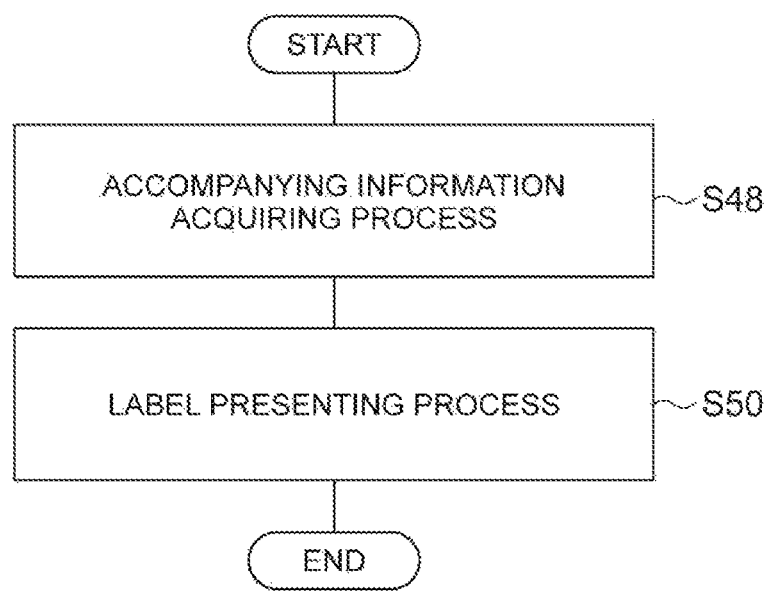
FIG. 16 is a flowchart showing another method for presenting the private label.

Next, a method for presenting the private label is described. FIG. 16 is a flowchart showing the method for presenting the private label. The flowchart shown in FIG. 16 is performed when the label edit button is pushed by the user, for example.

First, the label presentation unit 57A in the terminal device 50A refers to the given label storage unit 53 to acquire the accompanying information, as an accompanying information acquiring process (S48). Next, the label presentation unit 57A in the terminal device 50A uses the accompanying information to determine the private label, as a label presenting process (S50). Then, the label presentation unit 57A presents the determined private label to the user. When the process at S50 is completed, the method for presenting the private label ends.

As described above, the terminal device 50A according to the third embodiment can present the private label to the user depending on the action of the user. The terminal device 50A according to the third embodiment can present the private label to the user depending on the situation in generating the recognition target data. Therefore, it is possible to reduce an effort of the user to give the label.

Fourth Embodiment

A terminal device 50B according to the fourth embodiment is different in including an operation reception unit 55B, an image determination unit (determination unit) 59, a comment analysis unit (analysis unit) 60, and a label presentation unit 57B, and is the same in other points as compared with the terminal device 50 according to the second embodiment. The terminal device 50B according to the fourth embodiment has an additional function to reduce an effort of the user to give the label by presenting the private label to the user by use of a comment generated when the user shares the recognition target data.

Figure 17:
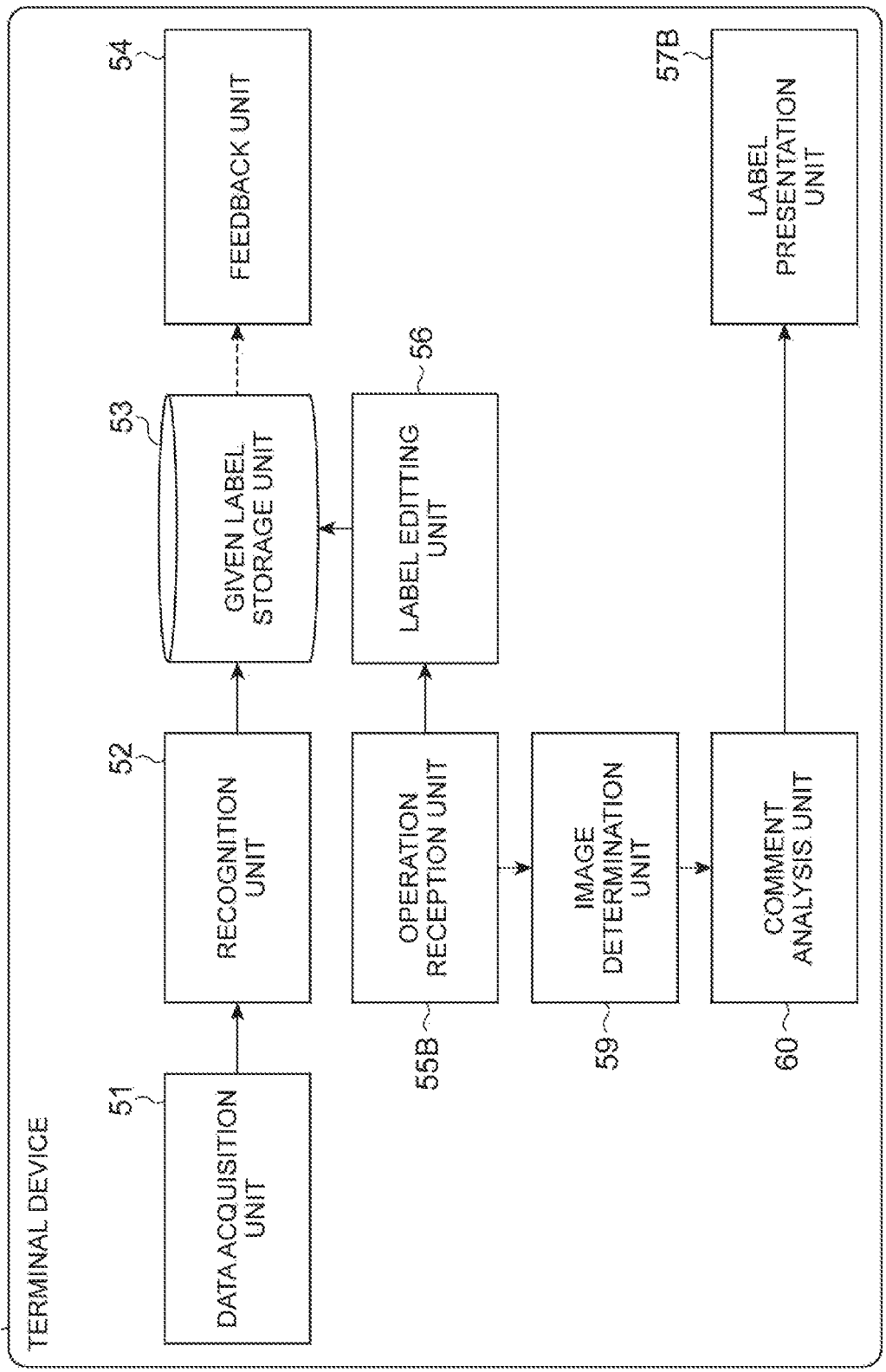
FIG. 17 is a functional block diagram of a terminal device according to a fourth embodiment.

FIG. 17 is a functional block diagram of the terminal device 50B according to the fourth embodiment. The terminal device 50B includes the data acquisition unit 51, the recognition unit 52, the given label storage unit 53, the feedback unit 54, the operation reception unit 55B, the label editing unit 56, the image determination unit 59, the comment analysis unit 60, and the label presentation unit 57B. Hardware of the terminal device 50B is the same as the terminal device 10.

The operation reception unit 55B accepts the user operation for attaching a comment to share the recognition target data with another person. For example, the operation reception unit 55B accepts an operation on the comment attached in sharing the image data with another person through the Internet. Specifically, the recognition target data attached with the comment may not be necessarily those in which the recognition target data is associated with the comment in the database, and may be the recognition target data and comment uploaded in the same time period.

The image determination unit 59 determines the recognition target data based on the user operation to share the recognition target data with another person. Subsequently, the comment analysis unit 60 analyzes content of the comment attached to the recognition target data specified by the image determination unit 59. The comment analysis unit 60 uses a well-known language function to analyze the content of the comment. The comment analysis unit 60 extracts a word from a sentence to output as an analysis result. The label presentation unit 57B presents the private label to the user based on the analysis result by the comment analysis unit 60. Specifically, the label presentation unit 57B estimates a season or event relating to the extracted word to present the private label to the user. Alternatively, the label presentation unit 57B may refer to the given label storage unit 53 to present the private label to the user based on a relationship between the season or event relating to the extracted word and the private label given in the past. Other configuration of the terminal device 50B is the same as the terminal device 50.

Figure 18:
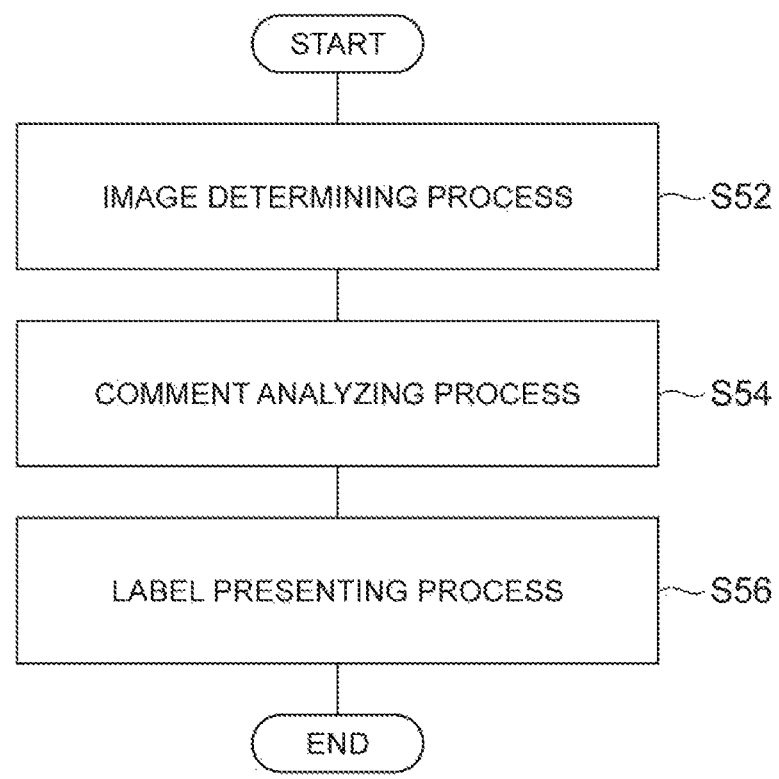
FIG. 18 is a flowchart showing another method for presenting the private label.

Next, a method for presenting the private label is described. FIG. 18 is a flowchart showing a method for presenting the private label. The flowchart shown in FIG. 18 is performed when a button for sharing the data is pushed by the user, for example.

First, the image determination unit 59 in the terminal device 50B determines the recognition target data based on the user operation to share the recognition target data with another person, as an image determining process (S52). Next, the comment analysis unit 60 in the terminal device 50B analyzes content of the comment attached to the recognition target data specified in the image determining process, as a comment analyzing process (S54). Next, the label presentation unit 57B in the terminal device 50B presents the private label to the user based on the analysis result by the comment analysis unit 60. When the process at S56 is completed, the method for presenting the private label ends.

As described above, the terminal device 50B according to the fourth embodiment can present the private label to the user depending on the comment given by the user. Therefore, the label relatively high in the accuracy can be presented with a simple configuration.

Fifth Embodiment

A terminal device 50C according to the fifth embodiment is different in including a list output unit 62, a representative label acquisition unit (relationship acquisition unit) 63, and an alteration suggestion unit 64 and is the same in other points as compared with the terminal device 50 according to the second embodiment. The terminal device 50C according to the fifth embodiment has an additional function to make the already given private labels easy to organize by pointing out orthographical variants, misdescription, and divergence of the private label. A training system 100A according to the fifth embodiment is different in including a language server 80 and is the same in other points as compared with the training system according to the first embodiment.

Figure 19:
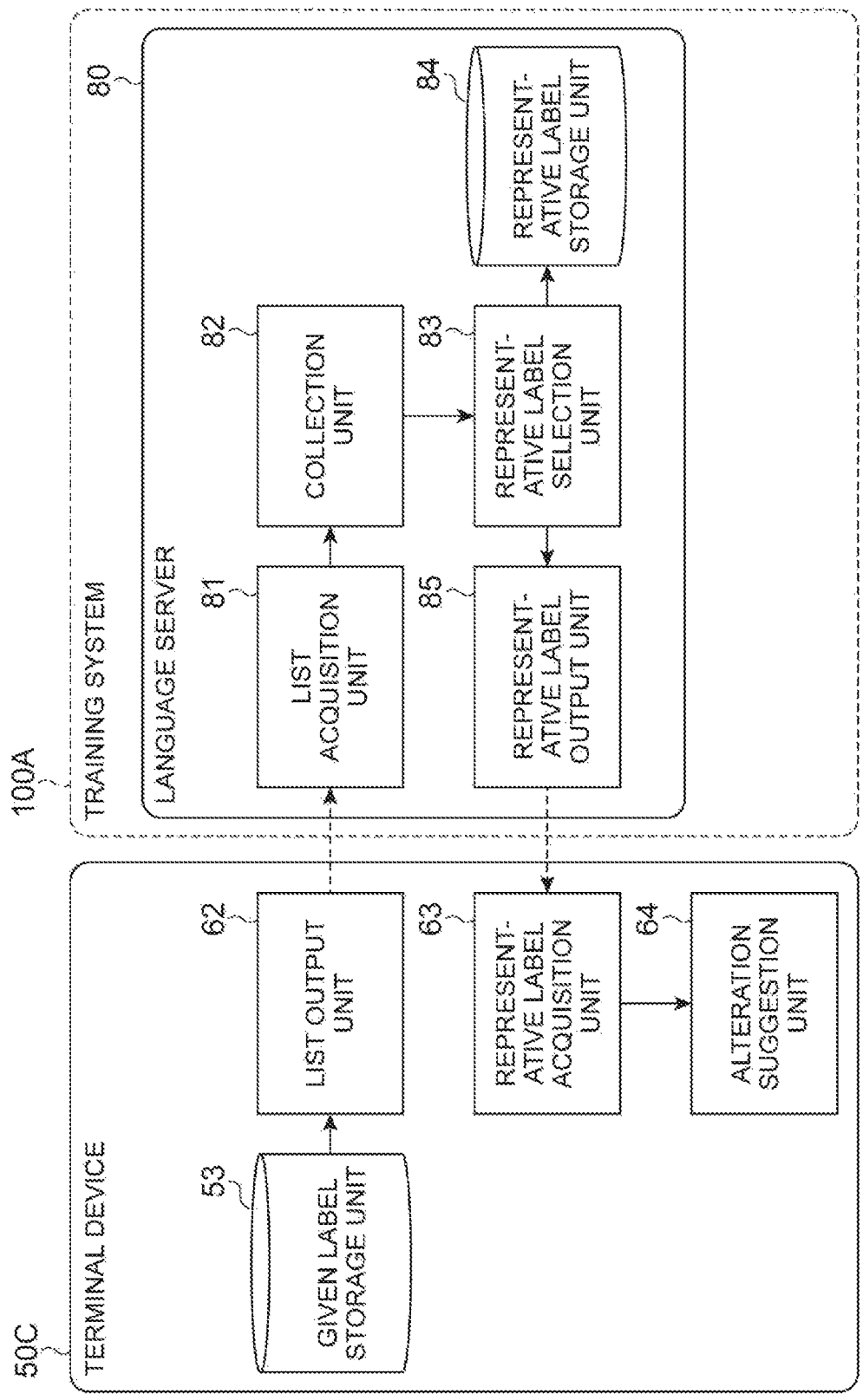
FIG. 19 is a functional block diagram of a training system and terminal device according to a fifth embodiment.

FIG. 19 is a functional block diagram of the training system 100A and the terminal device 50C according to the fifth embodiment. The terminal device 50C includes the data acquisition unit 51 (not shown), the recognition unit 52 (not shown), the given label storage unit 53, the feedback unit 54 (not shown), the operation reception unit 55 (not shown), the label editing unit 56 (not shown), the list output unit 62, the representative label acquisition unit 63, and the alteration suggestion unit 64. Hardware of the terminal device 50C is the same as the terminal device 10. The training system 100A includes the training data creation device 30 (not shown), the training device 40 (not shown), and the language server 80. Hardware of the language server 80 is the same as the terminal device 10. The terminal device 50C is configured to be capable of communicating with the language server 80.

First, a description is given of details of the configuration of the terminal device 50C. The list output unit 62 outputs a list of the given private labels to the language server 80. Specifically, the list output unit 62 refers to the given label storage unit 53, and lists a predetermined range (a predetermined number) of private labels to output to the language server 80. This list may be only text information of the private label in the data shown in (A) or (B) of FIG. 11, for example. Of course, the list may include other information than the text information of the private label. As a specific example, the list output unit 62 outputs a list including the private label "cherry blossom", "cherry blosm", "flower viewing" and "FLOWER VIEWING".

The representative label acquisition unit 63 acquires a relationship between a representative label and the given private label from the language server 80. The representative label is a label collecting the similar private labels, or a label correcting the orthographical variants, the misdescription, or the like. As a specific example, the representative label acquisition unit 63 acquires the representative label "flower viewing" associated with the private label information "flower viewing" and "FLOWER VIEWING". Alternatively, the representative label acquisition unit 63 acquires the representative label "cherry blossom" associated with the private label information "cherry blossom" and "cherry blosm".

The alteration suggestion unit 64 suggests to the user to alter the private label to the representative label, based on the relationship acquired by the representative label acquisition unit 63. For example, the alteration suggestion unit 64 displays the given private label and the representative label on the display device to prompt the user to perform alteration. Note that displaying the suggestion is not limited to the above example. Other device than the display device, for example, a speaker, may be used to prompt the user through voice information.

Next, a description is given of details of the configuration of the language server 80. The language server 80 includes a list acquisition unit 81, a collection unit 82, a representative label selection unit 83, a representative label storage unit 84, and a representative label output unit 85.

The list acquisition unit 81 acquires a list from one or a plurality of terminal devices 50C. The list includes the text information of the private label as described above. The collection unit 82 collects the private label into a group, based on the list acquired by the list acquisition unit 81. The collection unit 82 groups the private labels in the list based on similarity of meaning, or similarity of sound. As a specific example, assume that the list includes the private label "cherry blossom", "cherry blosm", "flower viewing" and "FLOWER VIEWING". In this case, "cherry blossom" and "cherry blosm" are collected into one group. Additionally, "flower viewing" and "FLOWER VIEWING" are collected into one group.

The representative label selection unit 83 selects the representative label for the group collected by the collection unit 82. The representative label selection unit 83 selects the most searched word by use of a search engine on the Internet or the like as the representative label for the group into which the similar private labels are collected. The representative label selection unit 83 utilizes a dictionary database or the like to select a correct or proper word as the representative label in a case that the orthographical variants or the misdescription are included. As a specific example, the representative label selection unit 83 selects "cherry blossom" of which misdescription is altered as the representative label for the group into which "cherry blossom" and "cherry blosm" are collected. The representative label selection unit 83 selects "flower viewing" of which search results is the most as the representative label for the group into which "flower viewing" and "FLOWER VIEWING" are collected.

The representative label selection unit 83 may store the selected representative label in the representative label storage unit 84. The representative label selection unit 83 may refer to the representative label storage unit 84 to compare the selected representative label with the representative label in the past based on a representative label selecting history. The configuration like this can stabilize the representative label selected by the representative label selection unit 83.

The representative label output unit 85 outputs a relationship between the representative label and the given private label to the terminal device 50C, based on a selection result by the representative label selection unit 83.

Figure 20:
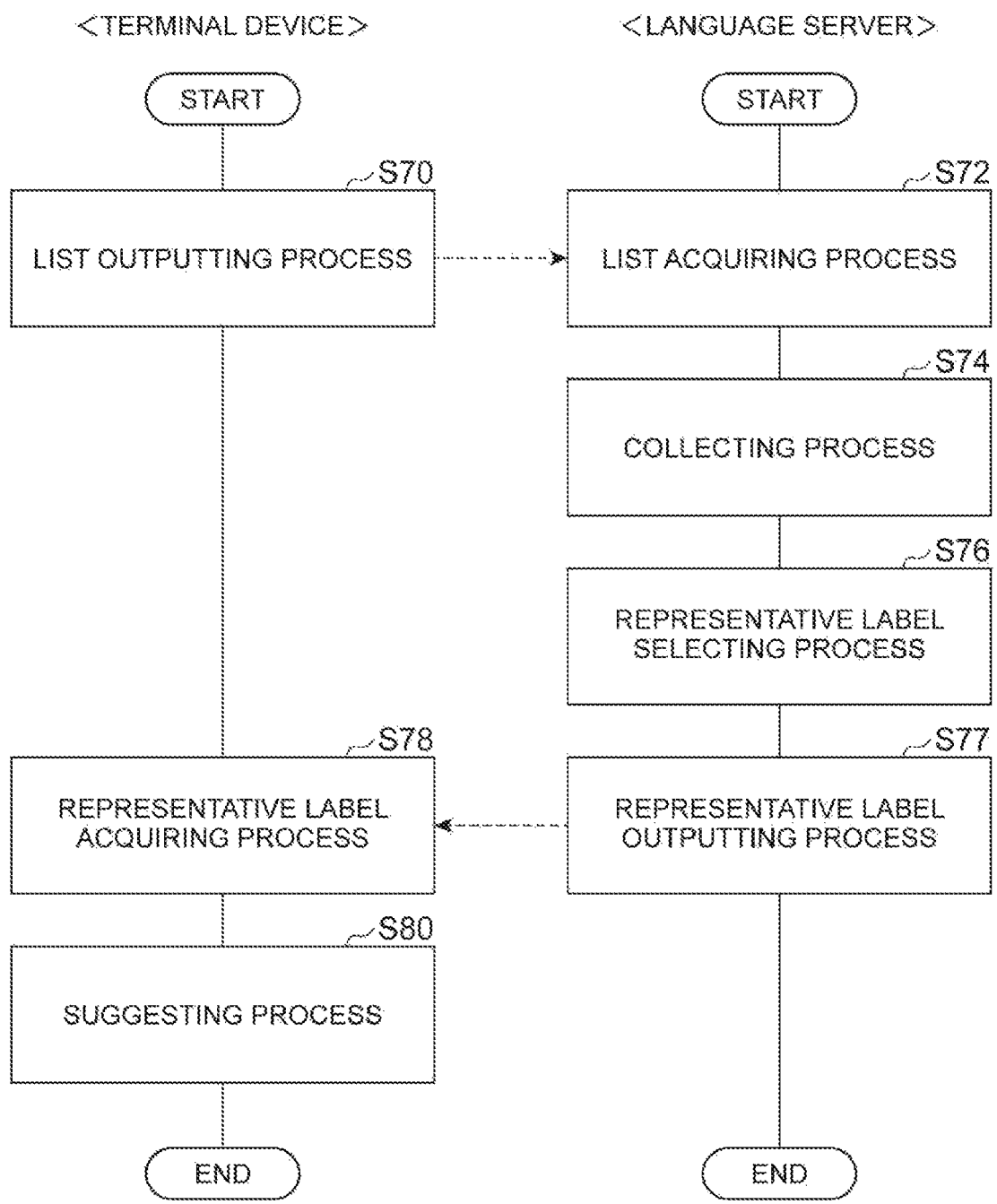
FIG. 20 is a flowchart showing a method for suggesting alteration of a private label.

Next, a method for suggesting alteration of the private label. FIG. 20 is a flowchart showing the method for suggesting the alteration of the private label. The flowchart shown in FIG. 20 may be performed at a predetermined timing.

First, the list output unit 62 in the terminal device 50C outputs the list of the given private labels to the language server 80, as a list outputting process (S70). Next, the list acquisition unit 81 in the language server 80 acquires the list, as a list acquiring process (S72).

Next, the collection unit 82 in the language server 80 collects the private label into a group, based on the list acquired by the list acquisition unit 81, as a collecting process (S74). Then, the representative label selection unit 83 in the language server 80 selects the representative label for the group collected by the collection unit 82, as a representative label selecting process (S76). The representative label output unit 85 in the language server 80 outputs the relationship between the representative label and the given private label to the terminal device 50C, based on a selection result by the representative label selection unit 83, as a representative label outputting process (S77).

Next, the representative label acquisition unit 63 in the terminal device 50C acquires the relationship between the representative label and the given private label from the language server 80, as a representative label acquiring process (S78). Next, the alteration suggestion unit 64 in the terminal device 50C suggests to the user to alter the private label to the representative label, based on the relationship acquired by the representative label acquisition unit 63, as a suggesting process (S80). When the process at S80 is completed, the method for suggesting the alteration of the private label ends.

As described above, the training system 100A and terminal device 50C according to the fifth embodiment can prompt the user to organize the private labels. Therefore, the already given private labels can be organized.

Sixth Embodiment

A training system 100B according to the sixth embodiment is different in including a threshold value setting unit 44 (an example of the threshold value changing device) and is the same in other points as compared with the training system 100 according to the first embodiment. Hereinafter, a description is mainly given of differences between the training system 100B and the training system 100 and the duplicated description is omitted.

In the training system 100 according to the first embodiment, the weight coefficient trained by the training device 40 is delivered to the terminal device 10. The terminal device 10 causes the recognition unit 11 to operate by use of the delivered weight coefficient. The recognition unit 11 updates the neural network by use of the delivered weight coefficient. Then, the recognition unit 11 acquires the recognition target data, and outputs by the neural network the recognition score indicating a degree of coincidence between the content of the recognition target data and a predetermined label. The recognition unit 11 gives the label corresponding to the recognition score equal to or more than a predetermined value to the recognition target data. Specifically, the recognition unit 11 outputs a recognition result indicating whether or not the content of the recognition target data coincides with a predetermined label by use of a threshold value set in advance for the recognition score and the recognition score. In other words, a predetermined value is a threshold value for determining the recognition score and is set in advance for the recognition score. The phrase "set in advance" means that the threshold value is defined before the recognition unit 11 performs the recognizing process. Note that in the first embodiment, the threshold value (a predetermined value) may be set in advance in default setting, or computed through evaluating by use of the evaluation data during or after training.

In the training system 100B according to the sixth embodiment, the threshold value is determined by use of the evaluation data. In other words, the threshold value is computed by evaluating the training recognition unit 42 or the recognition unit 11 by use of the evaluation data during or after training.

The evaluation data is data not overlapping the training data, and includes the truth evaluation for the input data and a predetermined label. The truth evaluation is associated with the input data, and indicates whether the content of the input data coincides with a predetermined label to have a positive evaluation, or the content of the input data does not coincide with a predetermined label to have a negative evaluation. Note that not only the "positive evaluation" and "negative evaluation" but also the "ignorable evaluation" may be included in the truth evaluation. However, the evaluation data given the "ignorable evaluation" is not used to determine the threshold value.

The training system 100B inputs the evaluation data into the neural network which is being trained or already trained, and uses the output recognition score to set the threshold value for the output from the training recognition unit 42 or recognition unit 11. FIG. 22 is a graph illustrating the threshold value of the recognition score. The graph shown in (A) and (B) of FIG. 22 indicates a result of causing the training recognition unit 42 or recognition unit 11 to recognize the evaluation data given the "positive evaluation" or "negative evaluation" for a predetermined label. An abscissa represents the recognition score, and an ordinate represents a degree. The recognition score is a score representing the recognition possibility. The degree is the number of pieces of the evaluation data. As described above, in the case that the training recognition unit 42 or the recognition unit 11 outputs the recognition score for the recognition target data, a threshold value $t_i$ is needed for determining the positive evaluation or the negative evaluation from the recognition score. As shown in (A) and (B) of FIG. 22, as a result of the evaluation by use of the evaluation data, a distribution of the data recognized as the positive evaluation and a distribution of the data recognized as the negative evaluation can be obtained. The training system 100B sets a recognition score distinguishing these distributions as the threshold value $t_i$ based on the general statistics. As a scheme for setting the threshold value using the general statistics, a f-measure that is a harmonic mean between a recall and a precision is used to set the threshold value, for example. The setting of the threshold value $t_i$ is described later in detail. In the example shown in (A) of FIG. 22, the threshold value $t_i$ is set for the evaluation score using the general statistics, and in the example shown in (B) of FIG. 22, the threshold value $t_i$ is set for the evaluation score using the general statistics.

Figure 23:
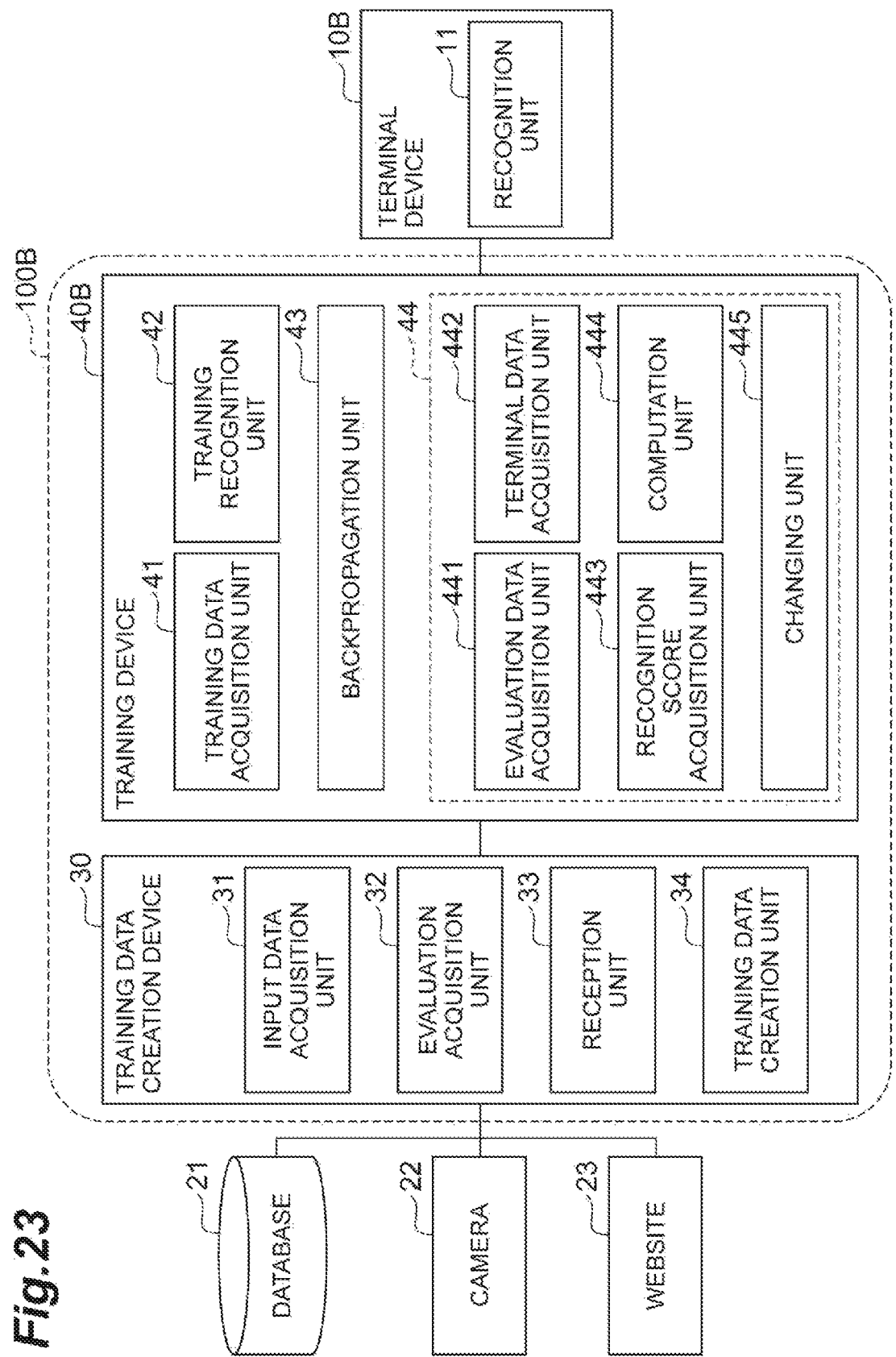
FIG. 23 is a functional block diagram of a training system and terminal device according to a sixth embodiment.

A description is given of a specific function of the training system 100B to perform a setting process for the threshold value $t_i$. FIG. 23 is a functional block diagram of the training system and terminal device according to the sixth embodiment. The training system 100B shown in FIG. 23 delivers the threshold value $t_i$ together with the training result to the terminal device 10B. The training system 100B is different in the training device 40B and is the same in other points as compared with the training system 100 according to the first embodiment.

The training device 40B is different in including the threshold value setting unit 44 and is the same in other point as compared with the training device 40 according to the first embodiment. The threshold value setting unit 44 includes an evaluation data acquisition unit 441, a terminal data acquisition unit 442, a recognition score acquisition unit 443, a computation unit 444, and a changing unit 445.

The evaluation data acquisition unit 441 acquires the evaluation data. The evaluation data is stored in a storage unit of the training device 40B, for example. The evaluation data includes the truth evaluation for a predetermined label (hereinafter, a label i is referred to as a predetermined label). To be more specific, the evaluation data is a set (data set) of image data (input data) given a label of truth. In the following description, a description is given assuming that a set of data recognized as the positive evaluation for the label i included in the evaluation data is $G_{i+}$, and the data recognized as the negative evaluation for the label i included in the evaluation data is $G_{i-}$. A description is also given assuming that the number of pieces of image data is #(X).

The terminal data acquisition unit 442 acquires a ratio $r_{i,a}$ between the positive evaluation and the negative evaluation for the label i of the data associated with the terminal device 10B. The terminal device 10B is the same as the terminal device 10 according to the first embodiment. The data associated with the terminal device 10B means the recognition target data relating to the terminal device 10B and is the already recognized data. Specifically, the data associated with the terminal device 10B is a set of the already recognized image data which is stored in the terminal device 10B, a set of the already recognized image data which is stored in an external recording medium and associated with a terminal ID or user ID of the terminal device 10B, or the like. As a more specific example, an album of the images stored in the terminal device 10B may be included in the associated data.

The ratio $r_{i,a}$ between the positive evaluation and the negative evaluation for the label i means a ratio between the number of pieces of data recognized as the positive evaluation and the number of pieces of data recognized as the negative evaluation in the already recognized data, and is an existence ratio between the data recognized as the positive evaluation and the data recognized as the negative evaluation. In the following description, a description is given assuming that a set of the data recognized as the positive evaluation is $G'_{i+}$ and a set of the data recognized as the negative evaluation is $G'_{i-}$ in the already recognized data associated with the terminal device 10B. Specifically, the ratio $r_{i,a}$ is a value obtained by dividing the number of pieces of data recognized as the positive evaluation by the number of pieces of data recognized as the negative evaluation, that is, $\#(G'_{i+})/\#(G'_{i-})$. For example, if the number $\#(G'_{i+})$ of pieces of data recognized as the positive evaluation is 10 and the number $\#(G'_{i-})$ of pieces of data recognized as the negative evaluation is 20, the ratio $r_{i,a}$ between the positive evaluation and the negative evaluation is 0.5.

The terminal data acquisition unit 442 can acquire the ratio $r_{i,a}$ between the positive evaluation and the negative evaluation for the label i by means of various schemes. As an example, the terminal data acquisition unit 442 acquires the ratio $r_{i,a}$ based on the recognition result by the neural network of the terminal device 10B. For example, in a case that the image data included in the album is already recognized by the recognition unit 11 in the terminal device 10B, the terminal data acquisition unit 442 can acquire the ratio $r_{i,a}$ based on the recognition result by the recognition unit 11. Alternatively, the terminal data acquisition unit 442 may acquire the ratio $r_{i,a}$ based on the result of annotation by the user of the terminal device 10B. Specifically, in a case that the image data included in the album is given the label by the user operation, the terminal data acquisition unit 442 can acquire the ratio $r_{i,a}$ based on the result of annotation.

Alternatively, the terminal data acquisition unit 442 can acquire the ratio $r_{i,a}$ based on the operation on the terminal device 10B by the user or the terminal information. As a specific example, the terminal data acquisition unit 442 estimates the ratio $r_{i,a}$ based on the user input (operation by the user) for the label i. For example, the terminal data acquisition unit 442 inquires of the user about a degree of interest indicating a degree of interest in the label i to estimate the ratio $r_{i,a}$ based the user input to the inquiry. Alternatively, the terminal data acquisition unit 442 may directly inquire of the user about the ratio $r_{i,a}$. Alternatively, the terminal data acquisition unit 442 may estimate the ratio $r_{i,a}$ based on the terminal information of the terminal device 10B. The terminal information means information stored in the terminal device 10B and includes locality data or the like. For example, the terminal data acquisition unit 442 estimates the ratio $r_{i,a}$ based on correlation between locality and the label i stored in advance, and the acquired locality data.

The recognition score acquisition unit 443 acquires the recognition score of a predetermined label for the input data from the neural network (the recognition unit 11) or a neural network (the training recognition unit 42) having a weight coefficient the same as a weight coefficient for the former neural network. The weight coefficient for the training recognition unit 42 is synchronized with the weight coefficient for the recognition unit 11, and therefore, the recognition score acquisition unit 443 may use either neural network. The recognition score acquisition unit 443 makes the training recognition unit 42 or recognition unit 11 read the evaluation data acquired by the evaluation data acquisition unit 441 to acquire the recognition score of a predetermined label for the input data.

The computation unit 444 evaluates the training recognition unit 42 or the recognition unit 11 by use of the recognition score acquired by the recognition score acquisition unit 443. In the following description, assume that the computation unit 444 evaluates the neural network of the training recognition unit 42. For example, the training recognition unit 42 outputs a recognition score $p_i$ (a degree of possibility for the label i (e.g., probability, as an example)) correspondingly to each image data included in the evaluation data, and compares the score $p_i$ with a threshold value $t_i$ set in advance to output either the "positive evaluation" ($p_i \geq t_i$) or the "negative evaluation" ($p_i < t_i$) as a recognition result. The training recognition unit 42 is evaluated by comparing the recognition result with the truth evaluation. As a more specific example, the training recognition unit 42 is evaluated by use of the number of pieces of data recognized as the positive evaluation for the input data with the truth evaluation being the positive evaluation (true positive), the number of pieces of data recognized as the negative evaluation for the input data with the truth evaluation being the negative evaluation (true negative), the number of pieces of data recognized as the negative evaluation for the input data with the truth evaluation being the positive evaluation (false negative), the number of pieces of data recognized as the positive evaluation for the input data with the truth evaluation being the negative evaluation (false positive), and the like.

The computation unit 444 uses at least the precision to make the evaluation. The precision is a value obtained by dividing the number of pieces of data for which the "positive evaluation" is true included in the data recognized as the "positive evaluation" by the training recognition unit 42 by the number of pieces of data recognized as the "positive evaluation". In the following description, assume that, for the label i, a set of data of which the recognition result is the "positive evaluation" is $P_{i+}$, and a set of data of which the recognition result is the "negative evaluation" is $P_{i-}$. In this case, the number of pieces of data used for the evaluation can be expressed by $\#(P_{i+})+\#(P_{i-})$. The number of pieces of data of the "true positive", the "true negative", the "false negative", and the "false positive" for the label i described above can be expressed as below. Note that $G_{i+}$ represents a set of data recognized as the positive evaluation for the label i included in the evaluation data, and $G_{i-}$ represents a set of data recognized as the negative evaluation for the label i included in the evaluation data.

$$\text{true-positive}(i) = \#(G_{i+} \cap P_{i+}) \text{ (Hereinafter } \cap \text{ denotes an AND symbol.)}$$

$$\text{true-negative}(i) = \#(G_{i-} \cap P_{i-})$$

$$\text{false-postive}(i) = \#(G_{i-} \cap P_{i+})$$

$$\text{false-negative}(i) = \#(G_{i+} \cap P_{i-}) \quad \text{[Expression 12]}$$

According to the above definition, the precision can be expressed as below.

[Expression 13]

$$\text{precision}(i) = \frac{\#(G_{i+} \cap P_{i+})}{\#(P_{i+})} = \frac{\#(G_{i+} \cap P_{i+})}{\#(G_{i+} \cap P_{i+}) + \#(G_{i-} \cap P_{i+})}$$

Note that the computation unit 444 may further use the recall for the evaluation. The recall is a value obtained by dividing the number of pieces of data recognized as the "positive evaluation" by the training recognition unit 42 in the data for which the "positive evaluation" is true by the number of pieces of data recognized as the "positive evaluation" in the evaluation data. Specifically, this can be expressed as below.

[Expression 14]

$$\text{recall}(i) = \frac{\#(G_{i+} \cap P_{i+})}{\#(G_{i+})} = \frac{\#(G_{i+} \cap P_{i+})}{\#(G_{i+} \cap P_{i+}) + \#(G_{i+} \cap P_{i-})}$$

In the case using the precision and the recall, the computation unit 444 computes a harmonic mean (f-measure) between the recall and the precision to use the computed value as an evaluation value. The f-measure is an index focusing on evenness of the recall and the precision.

[Expression 15]

$$f\text{-measure}(i) = \frac{2 \cdot \text{recall}(i) \cdot \text{precision}(i)}{\text{recall}(i) + \text{precision}(i)}$$

Figure 24:
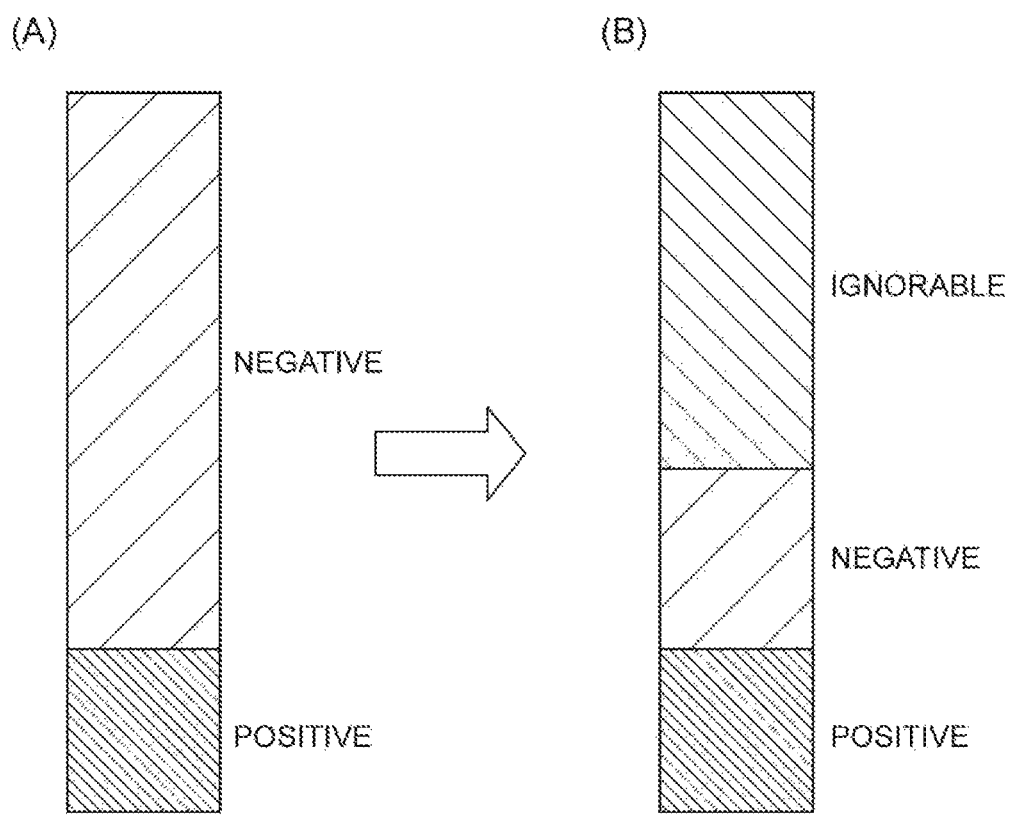
FIG. 24 is a diagram illustrating a deviation of data of evaluation data.

The evaluation value described above is affected by data distribution of the positive evaluation and negative evaluation in the evaluation data. Specifically, when there is deviation of the ratio between the positive evaluation and the negative evaluation in the evaluation data, the computed evaluation value becomes a value to which the deviation in the evaluation data is reflected. Therefore, it is ideally preferable that a difference is small between the data distribution of the evaluation data and an environment actually used by the user (the data distribution in the terminal device 10B). For this reason, the computation unit 444 has a function to correct the number of pieces of data such that the above described difference becomes smaller and use the corrected number of pieces of data to compute the precision. Particularly, when the "ignorable evaluation" is included in the evaluation data, the above described difference is possibly pronounced. FIG. 24 is a diagram illustrating the deviation of data of the evaluation data. The distribution shown in (A) of FIG. 24 is a true distribution (the distribution in the terminal device 10B) of the "positive evaluation" and the "negative evaluation". The distribution shown in (B) of FIG. 24 is a distribution in a case that the annotator subjects, for the label i, all evaluation data to tagging as the "positive evaluation", and after that, subjects a part of the evaluation data to tagging as the "negative evaluation", and the remaining evaluation data is set to the "ignorable evaluation". In this case, the data otherwise recognized as the "negative evaluation" is dealt with as the data of the "ignorable evaluation", and therefore, the data distribution of the evaluation data possibly differs largely from the data distribution of the user environment.

For this reason, the computation unit 444 corrects the evaluation data such that an existence ratio becomes the same as the ratio $r_{i,a}$ for the terminal device 10B to make the evaluation. The evaluation value by way of the ideal data is expressed as below. Note that, as described above, a set of data recognized as the positive evaluation is $G'_{i+}$ and a set of data recognized as the negative evaluation is $G'_{i-}$ in the already recognized data associated with the terminal device 10B. A set of data of which the recognition result is the "positive evaluation" is $P'_{i+}$ and a set of data of which the recognition result is the "negative evaluation" is $P'_{i-}$ in the already recognized data associated with the terminal device 10B.

[Expression 16]

$$\text{real-precision}(i) = \frac{\#(G'_{i+} \cap P'_{i+})}{\#(G'_{i+} \cap P'_{i+}) + \#(G'_{i-} \cap P'_{i+})}$$

$$\text{real-recall}(i) = \frac{\#(G'_{i+} \cap P'_{i+})}{\#(G'_{i+} \cap P'_{i+}) + \#(G'_{i+} \cap P'_{i-})}$$

Here, as described above, when the ratio between the "positive evaluation" and the "negative evaluation" is changed (when the data of the "negative evaluation" is set to the "ignorable evaluation" at random), the number of pieces of "false positive" included in the precision (specifically $\#(G'_{i-} \cap P'_{i+})$) varies. Therefore, the computation unit 444 makes a correction to decrease an effect of the variation of the number of pieces of "false positive". Specifically, the computation unit 444 makes the correction as below.

[Expression 17]

$$\text{false-positive-}amd(i) = \\ \#(G_{i-} \cap P_{i+}) \cdot r_{i,test} \cdot \frac{1}{r_{i,a}} = \#(G_{i-} \cap P_{i+}) \cdot \left(\frac{G_{i+}}{G_{i-}}\right) \cdot \left(\frac{G'_{i-}}{G'_{i+}}\right)$$

Here, $r_{i,test}$ represents the ratio between the "positive evaluation" and the "negative evaluation" in the evaluation data. In this way, the computation unit 444 corrects the number of pieces of "false positive" by use of the ratio $r_{i,test}$ between the "positive evaluation" and the "negative evaluation" in the evaluation data, and the ratio $r_{i,a}$ between the "positive evaluation" and the "negative evaluation" in the terminal device 10B to obtain the corrected number of pieces of "false positive". Specifically, the computation unit 444 computes the precision using the following expression 13.

[Expression 18]

$$\text{precision}(i) = \frac{\#(G_{i+} \cap P_{i+})}{\#(G_{i+} \cap P_{i+}) + \#(G_{i-} \cap P_{i+}) \cdot \left(\frac{G_{i+}}{G_{i-}}\right) \cdot \left(\frac{G'_{i-}}{G'_{i+}}\right)} \quad (13)$$

The changing unit 445 changes threshold value $t_i$ by use of the precision computed by the computation unit 444. For example, a recognition score with the precision being the highest may be the threshold value $t_i$. Alternatively, the changing unit 445 may change the threshold value $t_i$ to a recognition score with the harmonic mean between the recall and the precision being maximum.

Other configuration of the training system 100B and the terminal device 10B are the same as the training system 100 and the terminal device 10, respectively. As described above, the changed threshold value $t_i$ is delivered to the terminal device 10B.

Figure 25:
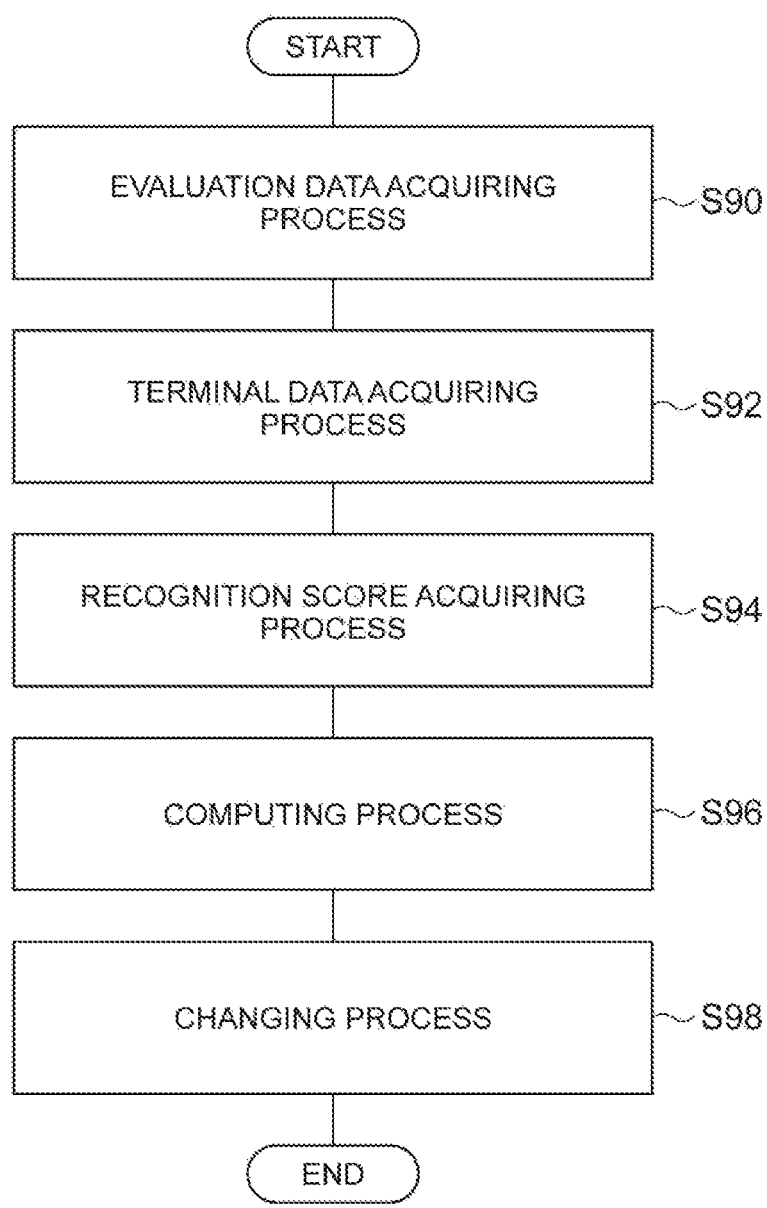
FIG. 25 is a flowchart showing a threshold value changing process.

Next, a description is given of a threshold value changing process by the training system 100B. FIG. 25 is a flowchart showing the threshold value changing process. The flowchart shown in FIG. 25 is performed at a predetermined timing during training, for example.

As shown in FIG. 25, the evaluation data acquisition unit 441 in the threshold value setting unit 44 acquires the evaluation data, as an evaluation data acquiring process (S90). The evaluation data acquisition unit 441 acquires a data set of image data which is given any of the "positive evaluation", the "negative evaluation", and the "ignorable evaluation" for the label i as the truth evaluation, for example.

Next, the terminal data acquisition unit 442 in the threshold value setting unit 44 acquires the terminal data, as a terminal data acquiring process (S92). The terminal data acquisition unit 442 acquires the ratio $r_{i,a}$ between the positive evaluation and the negative evaluation for the label i of the data associated with the terminal device 10B, for example.

Next, the recognition score acquisition unit 443 in the threshold value setting unit 44 acquires the recognition score, as a recognition score acquiring process (S94). The recognition score acquisition unit 443 makes the training recognition unit 42 read the evaluation data acquired in the evaluation data acquiring process (S90) to acquire the recognition score of a predetermined label for the input data.

Next, the computation unit 444 in the threshold value setting unit 44 computes the precision, as a computing process (S96). The computation unit 444 uses the expression 13 described above to compute the precision. Specifically, the computation unit 444 computes the "true positive" and the "false positive" based on the recognition score acquired in the recognition score acquiring process (S94). Then, the computation unit 444 corrects the "false positive" based on the ratio $r_{i,test}$ between the "positive evaluation" and the "negative evaluation" in the evaluation data, and the ratio $r_{i,a}$ acquired in the terminal data acquiring process (S92). The computation unit 444 computes the precision by use of the "true positive" and the corrected "false positive" (expression 13).

Next, the changing unit 445 in the threshold value setting unit 44 changes the threshold value $t_i$, as a changing process (S98). The changing unit 445 changes the threshold value $t_i$ by use of the precision computed in the computing process (S96). When the changing process (S98) is completed, the flowchart shown in FIG. 25 ends.

As described above, according to the threshold value setting unit 44 in the sixth embodiment, the number of pieces of data recognized as the positive evaluation for the input data of the negative evaluation is corrected by use of the ratio $r_{i,test}$ between the positive evaluation and the negative evaluation of the evaluation data, and the ratio $r_{i,a}$ between the positive evaluation and the negative evaluation of the data associated with the terminal device 10B. Then, the threshold value $t_i$ used in the recognition by the terminal device 10B is changed based on the precision for the label i computed by use of the number of pieces of data after the correction. In this way, in computing the precision for the label i, with taking into account the distribution of the positive and negative data of the evaluation data and the distribution of the positive and negative data of the terminal device 10B, the number of pieces of data recognized as the positive evaluation for the input data of the negative evaluation is corrected. (C) of FIG. 22 shows a case that the distribution of the positive and negative data of the evaluation data varies. For example, a part of the "negative evaluation" is changed to the "ignorable evaluation", the data distribution of the "positive evaluation" and the "negative evaluation" is changed (changing from a solid line to a dotted line in the figure), this may possibly involve that the threshold value $t_i$ is changed from a first threshold value $t_{i1}$ to a second threshold value $t_{i2}$. For this reason, the threshold value setting unit 44 can correct the number of pieces of "false positive" to make the ratio $r_{i,test}$ equal to the ratio $r_{i,a}$ in a pseudo manner. This makes it possible to properly change the threshold value $t_i$ in conformity to the terminal device 10B.

Seventh Embodiment

A terminal device 10C according to the seventh embodiment is different in including a threshold value setting unit 44C (an example of the threshold value changing device) and is the same in other points as compared with the terminal device 10B according to the sixth embodiment (or the terminal device 10 according to the first embodiment). Hereinafter, a description is mainly given of differences between the terminal device 10C and the terminal device 10B (or, the terminal device 10) and the duplicated description is omitted.

The changing process on the threshold value $t_i$ which is described in the sixth embodiment needs to use the evaluation data having certain numbers of data pieces. For this reason, in the case of the process by the terminal device 10B, time may be possibly taken. The terminal device 10C according to the seventh embodiment stores in advance therein a relationship between the ratio $r_{i,a}$ and the threshold value $t_i$ to achieve properly changing the threshold value $t_i$ depending on the environment change of the terminal device 10C, the ratio $r_{i,a}$ being that between the positive evaluation and the negative evaluation of the data associated with the terminal device 10C.

Figure 26:
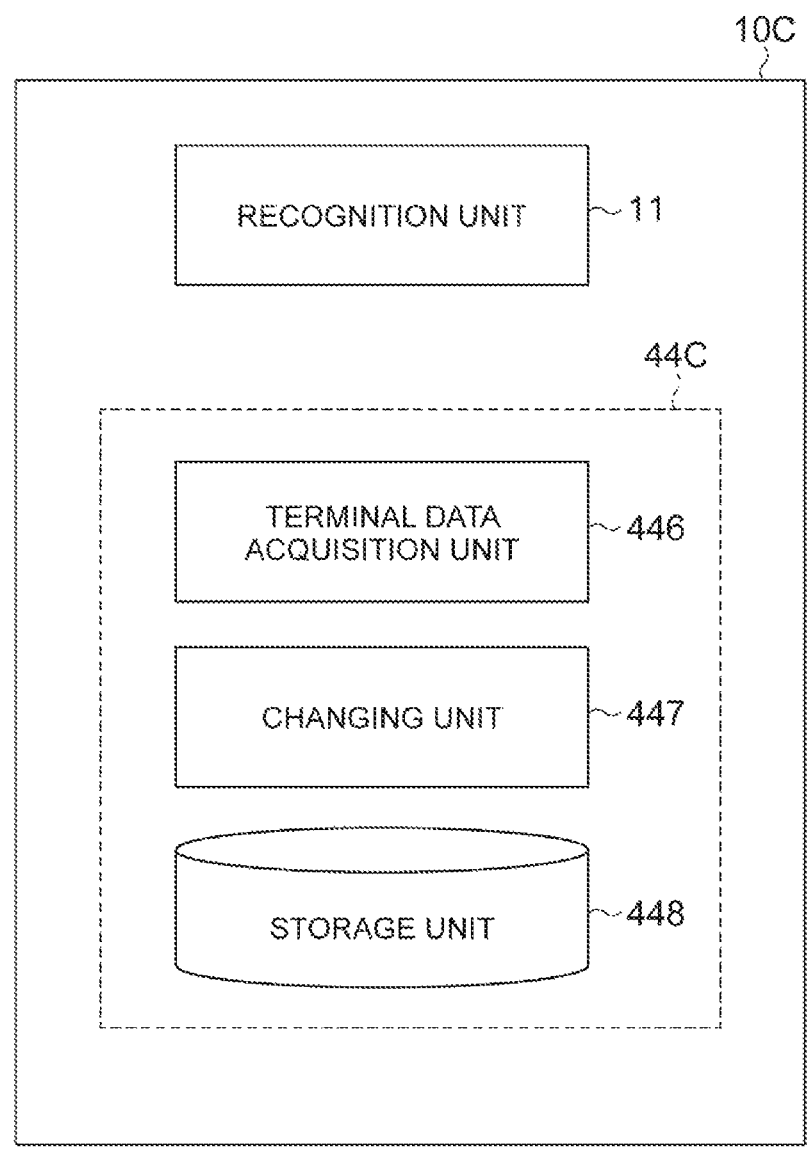
FIG. 26 is a functional block diagram of a terminal device according to a seventh embodiment.

FIG. 26 is a functional block diagram of the terminal device 10C according to the seventh embodiment. As shown in FIG. 26, the terminal device 10C includes a terminal data acquisition unit 446, a changing unit 447, and a storage unit 448.

The terminal data acquisition unit 446 has a function the same as the terminal data acquisition unit 442 according to the sixth embodiment. The storage unit 448 stores therein the relationship between the ratio $r_{i,a}$ and the threshold value $t_i$, the ratio $r_{i,a}$ being that between the positive evaluation and the negative evaluation of the data associated with the terminal device 10C. For example, the storage unit 448 stores therein a function, threshold value $t_i$, of the ratio $r_{i,a}$. Alternatively, the threshold values $t_i$ of a plurality of the ratios $r_{i,a}$ are discretely stored, such as the threshold value $t_i(0.1)$ when the ratio $r_{i,a}$ is 0.1, the threshold value $t_i(0.2)$ when the ratio $r_{i,a}$ is 0.2, and the threshold value $t_i(0.3)$ when the ratio $r_{i,a}$ is 0.3.

The changing unit 447 changes the threshold value $t_i$ by use of the relationship stored in the storage unit 448 and the ratio $r_{i,a}$ acquired by the terminal data acquisition unit 446. For example, the changing unit 447 acquires the changed threshold value $t_i$ by use of the function, threshold value $t_i$, of the ratio $r_{i,a}$ stored in the storage unit 448 and the ratio $r_{i,a}$ acquired by the terminal data acquisition unit 446. Alternatively, changing unit 447 acquires the changed threshold value $t_i$ through interpolation by use of the threshold values $t_i$ discretely stored in the storage unit 448 and the ratio $r_{i,a}$ acquired by the terminal data acquisition unit 446. For example, in a case that the threshold value $t_i$ of the ratio $r_{i,a}$ every 0.1 is stored in the storage unit 448, when the ratio $r_{i,a}$ acquired by the terminal data acquisition unit 446 is 0.15, the changing unit 447 sets the changed threshold value $t_i$ to $(t_i(0.1)+t_i(0.2))/2$ (linear interpolation). The changing unit 447 replaces the current threshold value with the changed threshold value $t_i$. Other configuration of the terminal device 10C is the same as the terminal device 10B.

Figure 27:
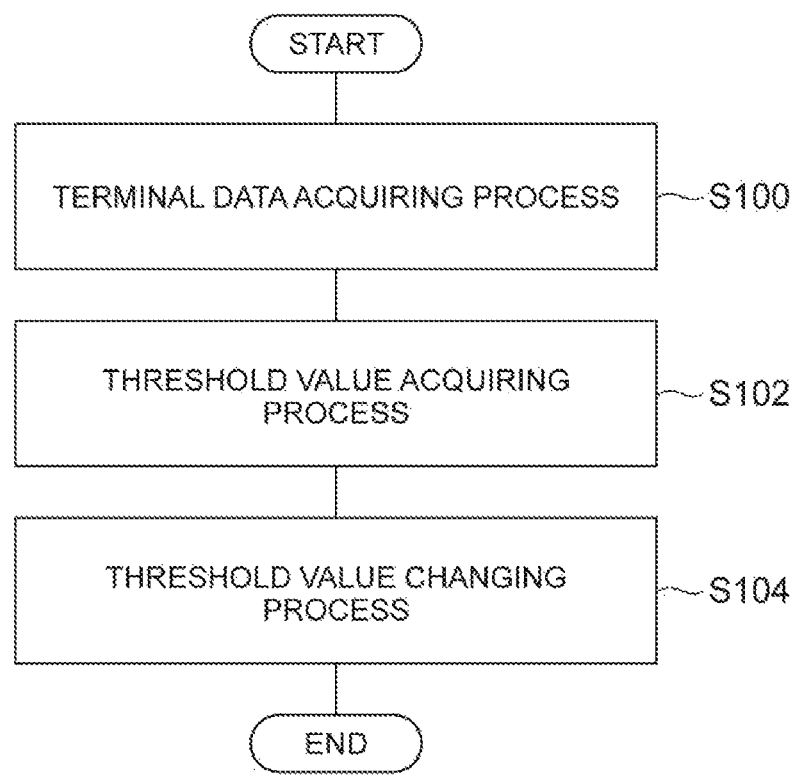
FIG. 27 is a flowchart showing a threshold value changing process.

Next, a description is given of the threshold value changing process. FIG. 27 is a flowchart showing the threshold value changing process. The flowchart shown in FIG. 27 is performed when a button for starting the threshold value changing process is pushed by the user operation, for example.

As shown in FIG. 27, the terminal data acquisition unit 446 in the terminal device 10C acquires the terminal data, as a terminal data acquiring process (S100). The terminal data acquisition unit 446 acquires the ratio $r_{i,a}$ between the positive evaluation and the negative evaluation for the label i of the data associated with the terminal device 10C, for example.

Next, the changing unit 447 in terminal device 10C acquires the changed threshold value $t_i$, as a threshold value acquiring process (S102). The changing unit 447 acquires the changed threshold value $t_i$, based on the relationship between the ratio $r_{i,a}$ and the threshold value $t_i$ stored in the storage unit 448, and the ratio $r_{i,a}$ acquired in the terminal data acquiring process (S100), for example.

Next, the changing unit 447 in the terminal device 10C changes the threshold value $t_i$, as a threshold value changing process (S104). The changing unit 447 replaces the current threshold value $t_i$ with the changed threshold value $t_i$ acquired in the threshold value acquiring process (S102). When the changing process (S104) is completed, the flowchart shown in FIG. 27 ends.

As described above, according to the threshold value setting unit 44C in the seventh embodiment, the threshold value $t_i$ is changed by use of the relationship stored in advance between the ratio stored in advance $r_{i,a}$ and the threshold value $t_i$, and the ratio $r_{i,a}$ acquired by the terminal data acquisition unit 446. In this way, the use of the relationship stored in advance between the ratio $r_{i,a}$ and the threshold value $t_i$ can reduce an arithmetic operation load for the threshold value change. The ratio $r_{i,a}$ between the positive evaluation and the negative evaluation of the data associated with the terminal device is different for each terminal device. According to the threshold value setting unit 44C in the seventh embodiment, it is possible to make a change to an optimal threshold value $t_i$ depending on a usage environment the terminal device 10C.

Note that the present invention is not limited to the above embodiments. The invention can be variously modified within a scope not departing from the gist thereof.

Figure 21:
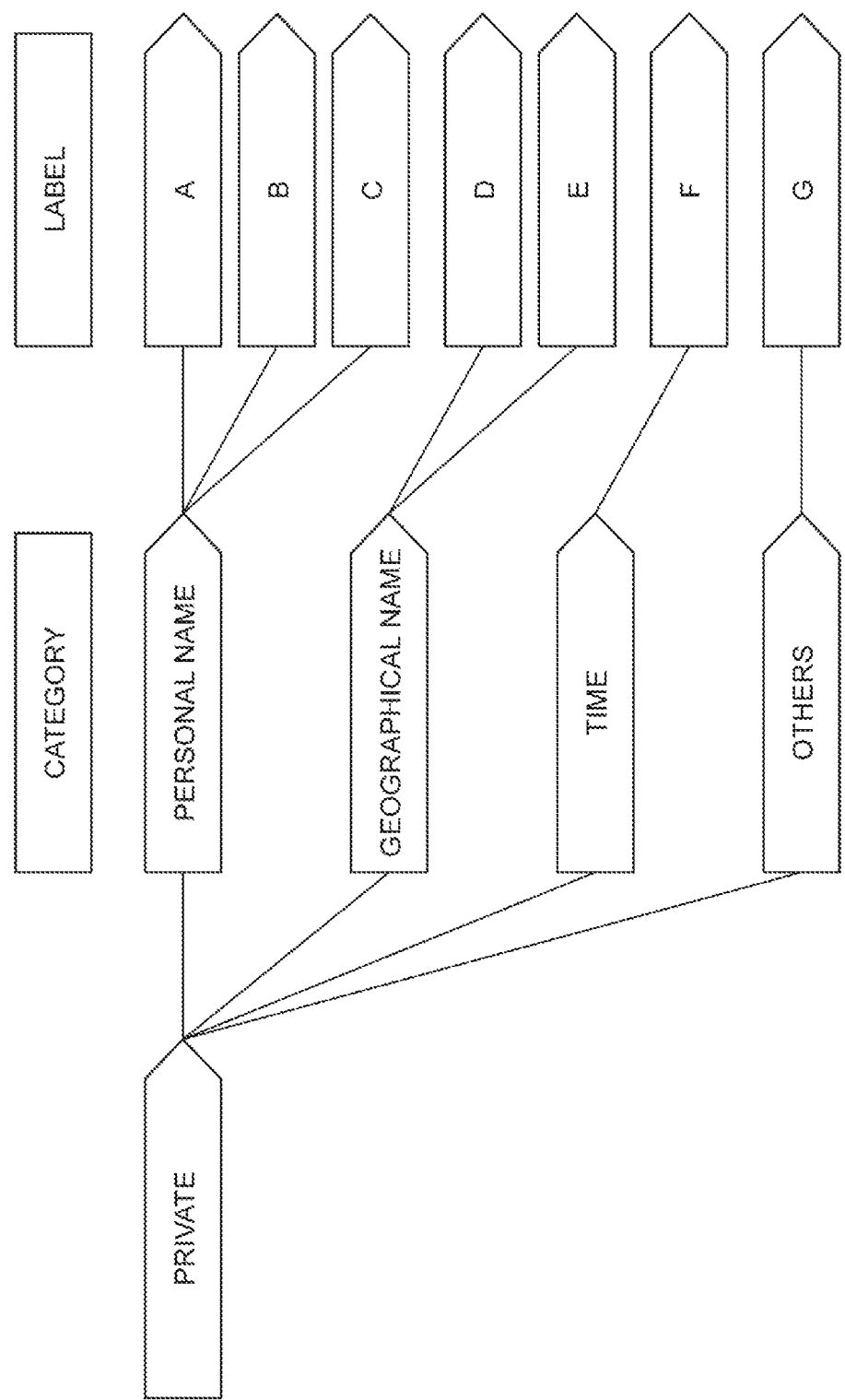
FIG. 21 is a diagram showing a hierarchical structure of the private label.

For example, the private label may be hierarchized. FIG. 21 is a diagram showing a hierarchical structure of the private label. As show in FIG. 21, the hierarchized private label has an item "category" for classifying the labels. In the example in FIG. 21, the label "A", "B", and "C" are classified into a category "personal name", the label "D" and "E" classified into a category "geographical name", the label "F" is classified into a category "time", and the label "G" is classified into a category "others". By hierarchizing like this, it is easy for the user to fine an intended label, and the terminal device can select the private label after estimating a candidate in units of category to efficiently present the private label to the user, for example.

In the terminal device described above according to the second embodiment to the fourth embodiment, the case that the private label is output is described, but the private label may be automatically given on the terminal device side. A configuration may be used in which the private label is upgraded to the public label in a case that the private label satisfies a predetermined condition. For example, in a case that more than certain numbers of users use the same private label, the relevant private label may be changed to the public label. Alternatively, the training system may tally the private labels given to the same public label to change the relevant private label to the public label depending on a usage condition.

The training system 100B described above according to the sixth embodiment is described as a training system which can use not only the positive evaluation and the negative evaluation but also the ignorable evaluation, but does not necessarily use the ignorable evaluation. In other words, the threshold value setting unit 44 described in the sixth embodiment may be applied to the training system of related art which depends on only the positive evaluation and the negative evaluation. Even in this case, it is possible to properly change the threshold value in conformity to the terminal device.

The threshold value setting unit 44 described above according to the sixth embodiment may be included not only in the training device 40B but also in the terminal device 10B. The terminal data acquiring process (S92) shown in FIG. 25 is not limited to being performed between the evaluation data acquiring process (S90) and the recognition score acquiring process (S94), and may be performed before the computing process (S96).

The devices described above according to the second embodiment to the seventh embodiment may exert their functions through programs. Other embodiments than the second embodiment to the seventh embodiment include methods corresponding to the operations of these devices, programs having the functions of the relevant devices, or storage media storing therein the relevant programs.

REFERENCE SIGNS LIST 10, 50, 50A, 50B, 50C, 10B, 10C . . . Terminal device, 11, 52 . . . Recognition unit, 30 . . . Training data creation device, 31 . . . Input data acquisition unit, 32 . . . Evaluation acquisition unit, 33 . . . Reception unit, 34 . . . Training data creation unit, 40, 40B . . . Training device, 41 . . . Training data acquisition unit, 42 . . . Training recognition unit, 43 . . . Backpropagation unit, 55, 55B . . . Operation reception unit, 56 ... Label editing unit, 57A, 57B ... Label presentation unit, 59 ... Image determination unit, 60 ... Comment analysis unit, 62 ... List output unit, 63 ... Representative label acquisition unit, 64 ... Alteration suggestion unit, 80 ... Language server, 81 ... List acquisition unit, 82 ... Collection unit, 83 ... Representative label selection unit, 84 ... Representative label storage unit, 85 ... Representative label output unit, 44, 44C ... Threshold value setting unit, ti ... Threshold value, 100, 100A, 100B ... Training system, 111 ... Input layer, 112 ... Intermediate layer, 113 ... Output layer, 441 ... Estimation data acquisition unit, 442, 446 ... Terminal data acquisition unit, 443 ... Recognition score acquisition unit, 444 ... Computation unit, 445, 447 ... Changing unit

The invention claimed is:

1. A training system comprising:
a training device configured to train a neural network by means of a backpropagation algorithm, the neural network using a plurality of labels to classify recognition target data; and
a training data creation device configured to create training data for the training device,
the training data creation device comprising:
a processor; and
a memory storing executable instructions that, when executed by the processor, causes the processor to perform as:
an input data acquisition unit configured to acquire input data;
an evaluation acquisition unit configured to acquire any one of a positive evaluation indicating that content of the input data coincides with a label, a negative evaluation indicating that content of the input data does not coincide with the label, and an ignorable evaluation indicating exclusion from a training target label, for each label regarding the input data acquired by the input data acquisition unit; and
a training data creation unit configured to associate the input data acquired by the input data acquisition unit with the evaluation for each label acquired by the evaluation acquisition unit to create the training data;
the training device comprising:
a processor; and
a memory storing executable instructions that, when executed by the processor, causes the processor to perform as:
a training data acquisition unit configured to acquire the training data created by the training data creation device;
an input layer configured to acquire, as a score, the input data included in the training data acquired by the training data acquisition unit;
an intermediate layer configured to perform an arithmetic operation on the score acquired by the input layer by use of a weight coefficient;
an output layer configured to output a recognition score for each label by use of the score subjected to the arithmetic operation by the intermediate layer; and
a backpropagation unit configured to adjust the weight coefficient for the intermediate layer by use of the recognition score for each label output by the output layer and a ground-truth score of the evaluation for each label,
wherein the backpropagation unit adjusts the weight coefficient for the intermediate layer such that the recognition score of the label with the positive evaluation or the negative evaluation comes closer to the ground-truth score of the positive evaluation or the negative evaluation, and makes the recognition score of the label with the ignorable evaluation not affect the adjustment of the weight coefficient for the intermediate layer.

2. The training system according to claim 1, wherein the backpropagation unit sets the ground-truth score of the ignorable evaluation to a same value as the recognition score of the label with the ignorable evaluation, changes a difference between the ground-truth score of the ignorable evaluation and the recognition score of the label with the ignorable evaluation to 0, or changes a derivative of the difference between the ground-truth score of the ignorable evaluation and the recognition score of the label with the ignorable evaluation to 0.

3. The training system according to claim 1, wherein the backpropagation unit blocks communication of the neural network for the label with the ignorable evaluation.

4. The training system according to claim 1, wherein the backpropagation unit blocks communication of the neural network for the label with the ignorable evaluation.

5. The training system according to claim 1, wherein
the training data creation device processor further performs as a reception unit accepting a user operation specifying the evaluation of the label, and
the evaluation acquisition unit acquires the evaluation of the label specified by the user operation accepted by the reception unit.

6. The training system according to claim 5, wherein
the reception unit accepts the user operation specifying an evaluation of a part of the labels of the input data, and
the training data creation unit associates the evaluation of the part of the labels acquired by the evaluation acquisition unit with the input data acquired by the input data acquisition unit, and makes evaluations of remaining labels of the input data have the ignorable evaluations.

7. The training system according to claim 1, wherein
the training data creation unit makes the evaluations of all labels of the input data have the ignorable evaluations, before associating the evaluation of the label acquired by the evaluation acquisition unit with the input data acquired by the input data acquisition unit.

8. A training device training a neural network by means of a backpropagation algorithm, the neural network using a plurality of labels to classify recognition target data, the training device comprising:
a processor; and
a memory storing executable instructions that, when executed by the processor, causes the processor to perform as:
a training data acquisition unit configured to acquire training data, the training data including input data and an evaluation for each label associated with the input data in advance;
an input layer configured to acquire, as a score, the input data included in the training data acquired by the training data acquisition unit;
an intermediate layer configured to perform an arithmetic operation on the score acquired by the input layer by use of a weight coefficient;
an output layer configured to output a recognition score for each label by use of the score subjected to the arithmetic operation by the intermediate layer; and
a backpropagation unit configured to adjust the weight coefficient for the intermediate layer by use of the recognition score for each label output by the output layer and a ground-truth score of the evaluation for each label, wherein the input data is associated with any one of a positive evaluation indicating that content of the input data coincides with a label, a negative evaluation indicating that content of the input data does not coincide with the label, and an ignorable evaluation indicating exclusion from a training target label, for each label, and the backpropagation unit adjusts the weight coefficient for the intermediate layer such that the recognition score of the label with the positive evaluation or the negative evaluation comes closer to the ground-truth score of the positive evaluation or the negative evaluation, and makes the recognition score of the label with the ignorable evaluation not affect the adjustment of the weight coefficient for the intermediate layer.

9. A method for training a neural network by means of a backpropagation algorithm, the neural network using a plurality of labels to classify recognition target data, the method comprising:

a training data acquiring step of acquiring training data, the training data including input data and an evaluation for each label associated with the input data in advance;

an inputting step, by an input layer, of acquiring, as a score, the input data included in the training data acquired in the training data acquiring step;

an arithmetic operating step, by an intermediate layer, of performing an arithmetic operation on the score acquired in the inputting step by use of a weight coefficient;

an outputting step, by an output layer, of outputting a recognition score for each label by use of the score subjected to the arithmetic operation in the arithmetic operating step; and a backpropagation step of adjusting the weight coefficient for the intermediate layer by use of the recognition score for each label output in the outputting step and a ground-truth score of the evaluation for each label, wherein the input data is associated with any one of a positive evaluation indicating that content of the input data coincides with a label, a negative evaluation indicating that content of the input data does not coincide with the label, and an ignorable evaluation indicating exclusion from a training target label, for each label, and the backpropagation step adjusts the weight coefficient for the intermediate layer such that the recognition score of the label with the positive evaluation or the negative evaluation comes closer to the ground-truth score of the positive evaluation or the negative evaluation, and makes the recognition score of the label with the ignorable evaluation not affect the adjustment of the weight coefficient for the intermediate layer.

10. A terminal device capable of communicating with the training device according to claim 8, wherein the processor further performs as:

a recognition target data acquisition unit configured to acquire the recognition target data;

a recognition unit configured to give the label representing content of the recognition target data to the recognition target data by use of a parameter trained by the training device;

an operation reception unit configured to accept a user operation determining a private label to be given to the recognition target data acquired by the recognition target data acquisition unit; and a label editing unit configured to give the private label to the recognition target data, based on the user operation accepted by the operation reception unit.

11. The terminal device according to claim 10, wherein the processor further performs as a label presentation unit configured to present the private label to a user based on a history of date and time of giving and a reference date and time of the private label given by the label editing unit.

12. The terminal device according to claim 10, wherein the processor further performs as a label presentation unit configured to present the private label to a user based on accompanying information given in generating the recognition target data.

13. The terminal device according to claim 10, wherein the operation reception unit accepts a user operation for attaching a comment to share the recognition target data with another person, and the terminal device processor further performs as:

a determination unit configured to determine the recognition target data to be shared, based on the user operation accepted by the operation reception unit, an analysis unit configured to analyze content of the comment attached to the recognition target data determined by the determination unit, and a label presentation unit configured to present the private label to a user, based on an analysis result by the analysis unit.

14. The terminal device according to claim 10, configured to be capable of communicating with a language server, and the processor further performs as:

a list output unit configured to output a list of the private label to the language server, a relationship acquisition unit configured to acquire a relationship between a representative label and the private label from the language server, and a suggestion unit configured to suggest to a user to alter the private label to the representative label, based on the relationship acquired by the relationship acquisition unit, wherein the language server includes a processor; and a memory storing executable instructions that, when executed by the processor, causes the processor to perform as:

a list acquisition unit configured to acquire the list from the terminal device, a collection unit configured to collect the private label into a group, based on the list acquired by the list acquisition unit, a representative label selection unit configured to select the representative label for the group collected into by the collection unit, and a representative label output unit configured to output a relationship between the representative label and the private label to the terminal device, based on a selection result by the representative label selection unit.

* * * * *